US012090116B2

(12) United States Patent
Foy

(10) Patent No.: US 12,090,116 B2
(45) Date of Patent: Sep. 17, 2024

(54) ROTOMOLDED SPA AND METHOD OF HANDLING A SPA

(71) Applicant: 9213-4550 QUÉBEC INC., Drummondville (CA)

(72) Inventor: Jérôme Foy, Orford (CA)

(73) Assignee: 9213-4550 QUÉBEC INC.

(*) Notice: Subject to any disclaimer, the term of this patent is extended or adjusted under 35 U.S.C. 154(b) by 74 days.

(21) Appl. No.: 18/156,122

(22) Filed: Jan. 18, 2023

(65) Prior Publication Data

US 2023/0225936 A1 Jul. 20, 2023

Related U.S. Application Data

(60) Provisional application No. 63/300,752, filed on Jan. 19, 2022.

(51) Int. Cl.
*A61H 33/00* (2006.01)

(52) U.S. Cl.
CPC ..... *A61H 33/6005* (2013.01); *A61H 33/0087* (2013.01); *A61H 2201/0107* (2013.01)

(58) Field of Classification Search
CPC .................................................... E04H 4/0037
See application file for complete search history.

(56) References Cited

U.S. PATENT DOCUMENTS 8,881,321 B1 * 11/2014 Ludlow ................. E04H 4/0037 4/506

* cited by examiner

*Primary Examiner* — Christine J Skubinna
(74) *Attorney, Agent, or Firm* — NORTON ROSE FULBRIGHT CANADA LLP

(57) ABSTRACT

There is disclosed a spa. The spa generally having a unibody shell having a base, a peripheral wall extending from the base up to a rim portion, a basin suspended from the rim portion, and at least one opening in the peripheral wall, the basin, the rim portion, the peripheral wall and the base defining a cavity therebetween, the at least one opening exposing the cavity, the base having a pair of channels recessed from the base towards the cavity; and a modular panel having a main panel covering the opening while exposing the pair of channels, and a subpanel engageable to the main panel and covering at least partially the pair of channels.

18 Claims, 16 Drawing Sheets

ROTOMOLDED SPA AND METHOD OF HANDLING A SPA

TECHNICAL FIELD

The improvements generally relate to the field of spas, and more specifically to spas having a rotationally-molded shell.

BACKGROUND OF THE ART

Spas, alternatively referred to as portable spas, hydrotherapy spas or hot tubs may be found in various shapes, sizes and types. Spas can be classified on the basis of their method of manufacture. Some spas may have a basin made by rotational molding, also known as rotomolding. Rotomolded spas have several advantages, and have been satisfactory to a certain degree, but there always remains room for improvement. For instance, the rotomolding fabrication process may cause certain challenges in terms of providing structure to the molded part while also achieving secondary objectives such as molding efficiency and total amount of plastic material used, etc., the latter affecting the costs significantly. On a structural aspect, not only should the overall structure of the spa be adapted to withstand, sporadically and over time, the weight of the contained water and of the bathers, but especially in cold climates, the structure may have to support the weight of a spa cover/hood. The rim portion of the spa, often already loaded with the weight of the water in the basin, and where user(s) may step or lean on to enter or exit the basin, may be particularly vulnerable to deformation. When loaded or simply during use, the top portion of the basin, which may form at least part of the rim portion of the spa, may warp from its original profile, which may cause undesirable stress to the molded part, improper sealing with a spa cover and associated energy inefficiencies, premature failure of the material of the molded part and/or an overall unappealing and/or non sturdy look. All these factors may militate in favor of over-designing the rotomolded component's structure.

SUMMARY

It is known that rotomolded spas have a relatively large structure and thus present challenges both in terms of transportation and storing. To transport and/or store such spas, the spas are generally positioned on pallets. The pallets provide surfaces on which the spas can rest and pallet openings for engagement with a lifting apparatus such as a forklift. Thus, using pallets provide a generally satisfactory way of moving the spas in warehouses and/or stores.

However, the use of pallets can involve undesirable costs, increase the amount of space required by a spa during its manufacture (for instance, in a manufacturing line, where it is displaced from one station to another), and reduce the number of spas which would be able to be stacked above one another in a warehouse and/or store due to the additional height provided by the pallets. Further, as the pallets merely provide a flat surface on which the spas may rest, there exists a risk of sideways slippage between stacked spas and their respective pallets. This is particularly the case during vehicular transportation, where the spas and pallets may shift with respect to one another due to vibrations and movement, for instance.

It was found that providing a rotomolded spa having a base with channels made integral to the base, with the channels being sized and shaped to engage with lifting means, can overcome at least some of these challenges. Such channels can permit for lifting means to safely engage the spa without the need for a pallet. As such, when the spa is placed on a floor, for instance, a portion of the base can be engaged with the floor while the channels may be engaged with the lifting means. The lifting means can be releasable when the base of the spa is engaged to the floor by moving the lifting means towards the floor away from the base, and then by sliding the lifting means out of the channels.

Further, it was found that providing a peripheral recess extending between the peripheral wall and the base of the spa, all around the spa, can permit to overcome some additional challenges. For instance, when spas having such peripheral recesses are stacked to one another, the peripheral recess of an above spa can be snugly received and abutted against a rim portion of an underneath spa. In this way, the amount of space stacked spas can take as a whole can be reduced in addition to reducing the risk of sideways slippage therebetween, even when subject to vibrations and movement such as is the case during vehicular transportation, for instance.

The channels and the peripheral recesses exposed at each side portion of such spas, however, can bring about an unsightly structure which may be deemed undesirable in a finished product. Accordingly, it was found convenient to use a modular panel having a main panel portion covering a substantial portion of the side portion of the spa and still exposing the channels and the peripheral recess for access thereof, and a subpanel which can be removably engaged to the remainder of the side portion to, when desired, cover the channels and peripheral recess of a side portion. In this way, when a spa is unloaded and placed in a desired location, the subpanel can discretely cover the channels and peripheral recesses that are exposed at the base of the spa.

In accordance with one aspect, there is provided a spa comprising: a unibody shell having a base, a peripheral wall extending from the base up to a rim portion, a basin suspended from the rim portion, and at least one opening in the peripheral wall, the basin, the rim portion, the peripheral wall and the base defining a cavity therebetween, the at least one opening exposing the cavity, the base having a pair of channels recessed from the base towards the cavity; and a modular panel having a main panel covering the opening while exposing the pair of channels, and a subpanel engageable to the main panel and covering at least partially the pair of channels.

In accordance with another aspect, there is provided a method of handling a spa, the spa having a unibody shell with a base, a peripheral wall extending from the base up to a rim portion, a basin suspended from the rim portion, and at least one opening in the peripheral wall, the basin, the rim portion, the peripheral wall and the base defining a cavity therebetween, the at least one opening exposing the cavity, the base having a pair of channels recessed from the base towards the cavity, the method comprising: engaging a main panel to the peripheral wall, the main panel covering the at least one opening and exposing the pair of channels; while the main panel remains engaged to the peripheral wall: using the pair of channels, moving the spa from a first location to a second location; and engaging a subpanel to the spa, the subpanel covering at least partially the pair of channels.

Many further features and combinations thereof concerning the present improvements will appear to those skilled in the art following a reading of the instant disclosure.

DESCRIPTION OF THE DRAWINGS

FIG. 12 is an exploded view of a spa having a modular panel with a main panel and a subpanel, in accordance with one or more embodiments;

DETAILED DESCRIPTION

Figure 1:
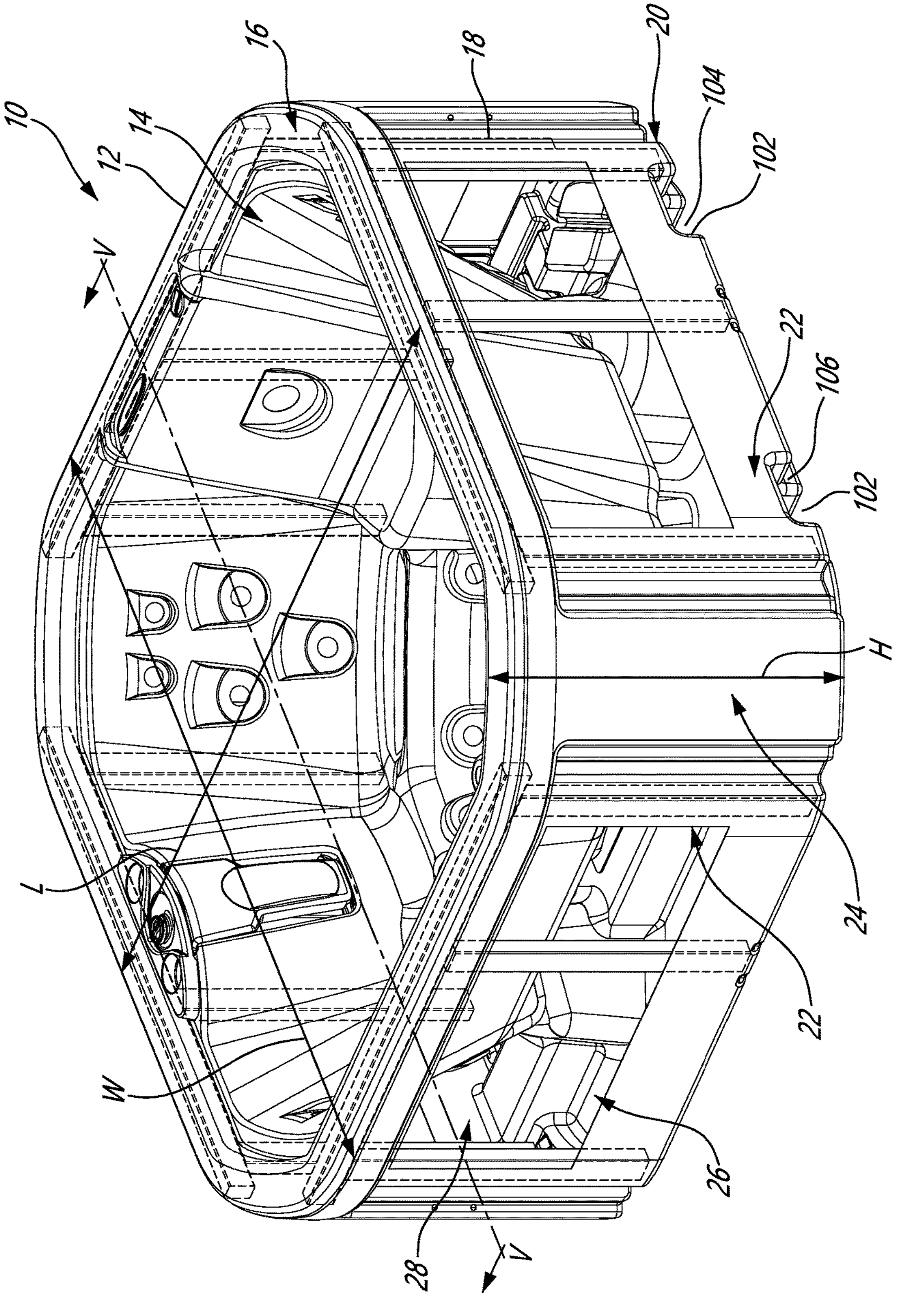
FIG. 1 is an oblique view of an example of a spa, shown with uncovered openings in side portions of the spa and a hidden frame system in dashed lines, in accordance to one or more embodiments.

FIG. 1 shows an exemplary spa 10, including a roto-molded unibody shell 12. The unibody shell 12 defines interior surfaces of the spa 10 and exterior surfaces of the spa 10 which may contribute to the structural rigidity of the spa 10 by their continuous and complex geometry when viewed as a whole. The unibody shell 12 may define ribs, ridges, grooves, undulations, recesses, corners and/or other protrusions or reliefs at selected locations in order to define rigidifying features of the shell 12.

As depicted, the shell 12 defines a basin 14 to receive water and bathers. The geometry of the basin 14 may define seat rest(s), armrest(s), headrest(s) jet opening(s) and/or cavities opened towards the interior of the basin 14. As depicted, the shell 12 defines a rim portion 16 at a top of the basin 14. The rim portion 16 may define a peripheral outline of the spa 10 at an upper end thereof. The rim portion 16 may receive portions of a spa cover/hood (not shown). As shown, the basin 14 is suspended from the rim portion 16 in this embodiment. In some embodiments, the rim portion 16 defines an uppermost surface of the shell 12 and faces upwardly, at least along part thereof. In this example, the rim portion 16 has a generally flat surface (e.g., with ±10° of inclination or slightly angled, domed or rounded). The shell defines a peripheral wall 18 and a base 20. As shown, the peripheral wall 18 extends from the base 20 up to the rim portion 16. The peripheral wall 18 extends from the rim portion 16 downwardly towards the base 20. The peripheral wall 18 may extend generally vertically (e.g., ±10°), though it could be skewed in other embodiments. The base 20 extends under the basin 14. The base 20 may include ridges or other reliefs, compared to a flat panel or the like, for greater rigidity. The base 20 may interface with the ground surface. The base 20 may have a surface (e.g., a continuous surface) or surface portions adapted to contact the ground and/or support surface upon which the spa 10 may be installed. The unibody shell 12 may define a self-supporting structure, meaning that the unibody shell 12 may support its own weight and/or maintain its shape without additional components. In some cases, a spa such as spa 10 with a unibody shell having a base such as base 20 may be portable and maintain its structural integrity and shape, even during handling and lifting, it can stand by itself on a level surface.

In this example, the spa 10 has a generally rectangular shape, in spite of its angled and/or curved corners. The spa 10 includes side portions 22 which may be substantially planar over most if not all of their lateral dimension in a peripheral direction of the spa 10, and corner portions 24, which may be curved or angled, of the shell 12 at the intersection of two side portions 22. As shown, corner portions 24 are formed on each lateral side of a side portion 22. Preferably, all the corner portions 24 are arced approximately 90° with a constant radius of curvature. More preferably, the corner portions 24 can be part of a same circle which are cut between one another by the side portions 22. As shown, while the corner portions 24 contribute to a lateral dimension defining portions of the periphery of the spa 10, the side portions 22 are considered the main sides of the spa 10 in that the side portions 22 may have between 2 to 5 times the lateral dimension of the corner portions 24, for example. It is understood that in alternative embodiments, rounded side portions or spa shapes with more or less sides, e.g., three, five, six sides forming other geometrical shape may also be contemplated. In some embodiments, spas 10 may have a custom shape, adapted to fit to a given outdoor or indoor setup.

The peripheral wall 18 defines a windowed structure of the spa 10. The side portions 22 are defined in part by the peripheral wall 18. As shown, the side portions 22 include openings 26, giving access to a cavity 28 defined between the basin 14 and the peripheral wall 18 as well as between the basin 14 and the base 20. In other words, the rim portion 16, the peripheral wall 18 and optionally the base 20 collectively define the cavity 28. The openings 26 may be sized identically or differently, depending on the embodiments. In the example shown, the openings 26 extend along a substantial extent of the side portions 22. The openings 26 may extend over between 50% and 90%±10% of the overall width W (or length L) of the spa 10, preferably 50% to 80% of the overall width W (or length L), more preferably 60% to 80% of the overall width W (or length L) or even move preferably 75%±10% of the overall width W or length L. The openings 26 may extend over between 50% and 95% of the overall height H of the shell 12 (measured from a bottom of the base 20 to a top of the rim portion 16), more preferably between 60% and 95% of the overall height H and more preferably between 75% and 95% of the overall height H of the shell 12. It may be desired to maximize a dimension (lateral and heightwise) of the openings 26 to facilitate access to the cavity 28, for maintenance, installation, verification of the enclosed equipment, for example.

Figure 1A:
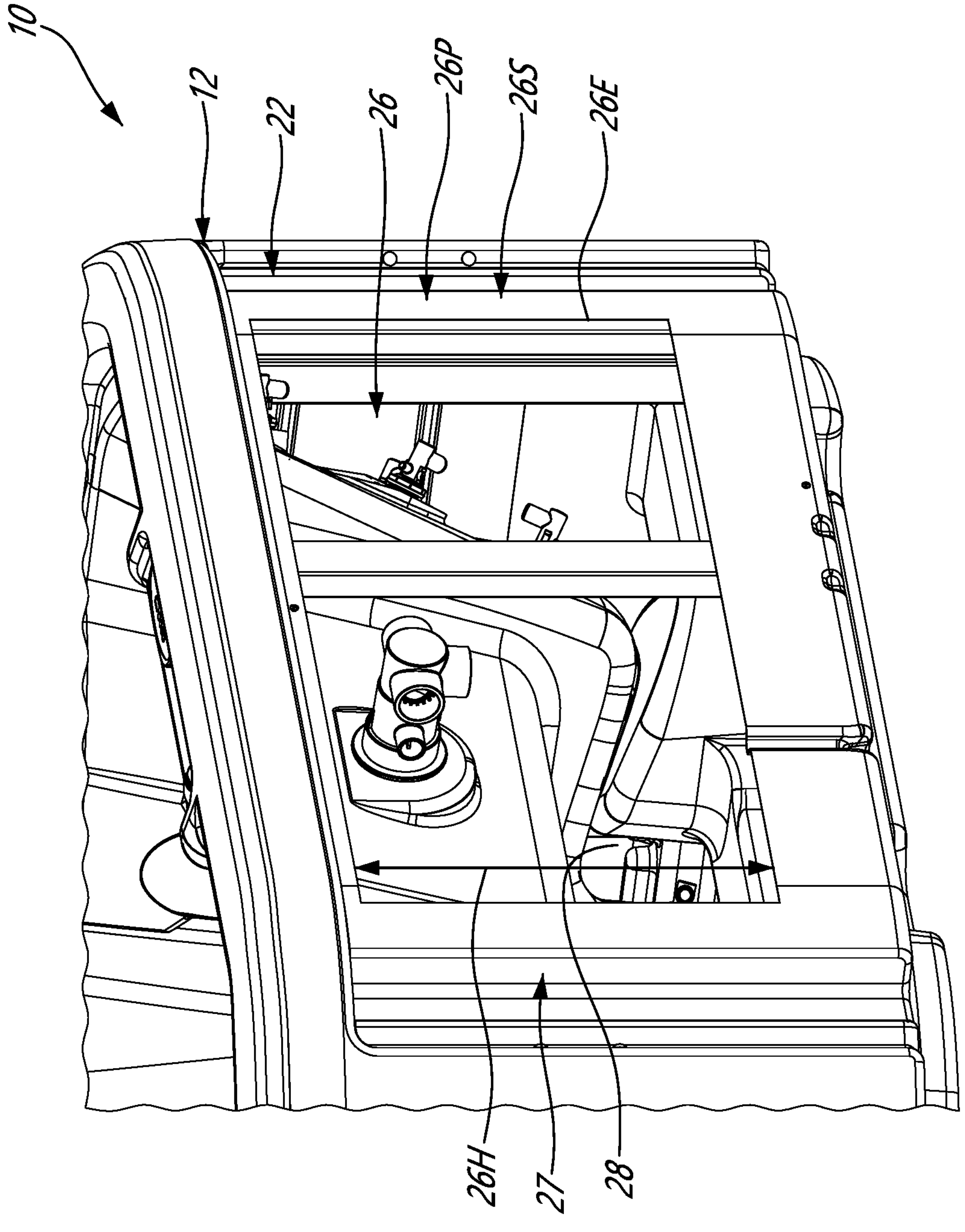
FIG. 1A is an enlarged view of a side portion of the spa of FIG. 1, showing an uncovered opening leading to a cavity within the spa, in accordance with one or more embodiments.

A magnified view of a side portion of the spa 10 is shown at FIG. 1A. In this view, it may better be seen that a periphery 26P of the opening 26 of the side portion 22 includes a flat surface 26S extending from a lateral edge 26E of the opening 26. Such flat surface 26S surrounding the opening 26 may interface with a back of a decorative panel, which is discussed later. The flat surface 26S extends in a peripheral direction (i.e., horizontal direction) of the spa 10 to a receding corner 27 defined in the shell 12 on opposite, lateral sides of the opening 26. As depicted, the receding corner 27 recedes inwardly towards the cavity and extends vertically parallel to a height of the opening 26. As illustrated, the receding corners 27 extend upwardly along the full height 26H of the opening 26, and beyond, towards the rim portion 16 and the base 20. Such receding corners 27 may add structural integrity to the shell 12. The receding corner 27 is opened outwardly relative to the spa 10. In other words, the receding corners 27 protrude towards the cavity 28, leaving a concave depression as viewed from the exterior of the spa 10. As shown, the flat surface 26S extending from the lateral edge 26E of the opening 26 extends in a plane offset outwardly with respect to the receding corners 27.

Figure 2:
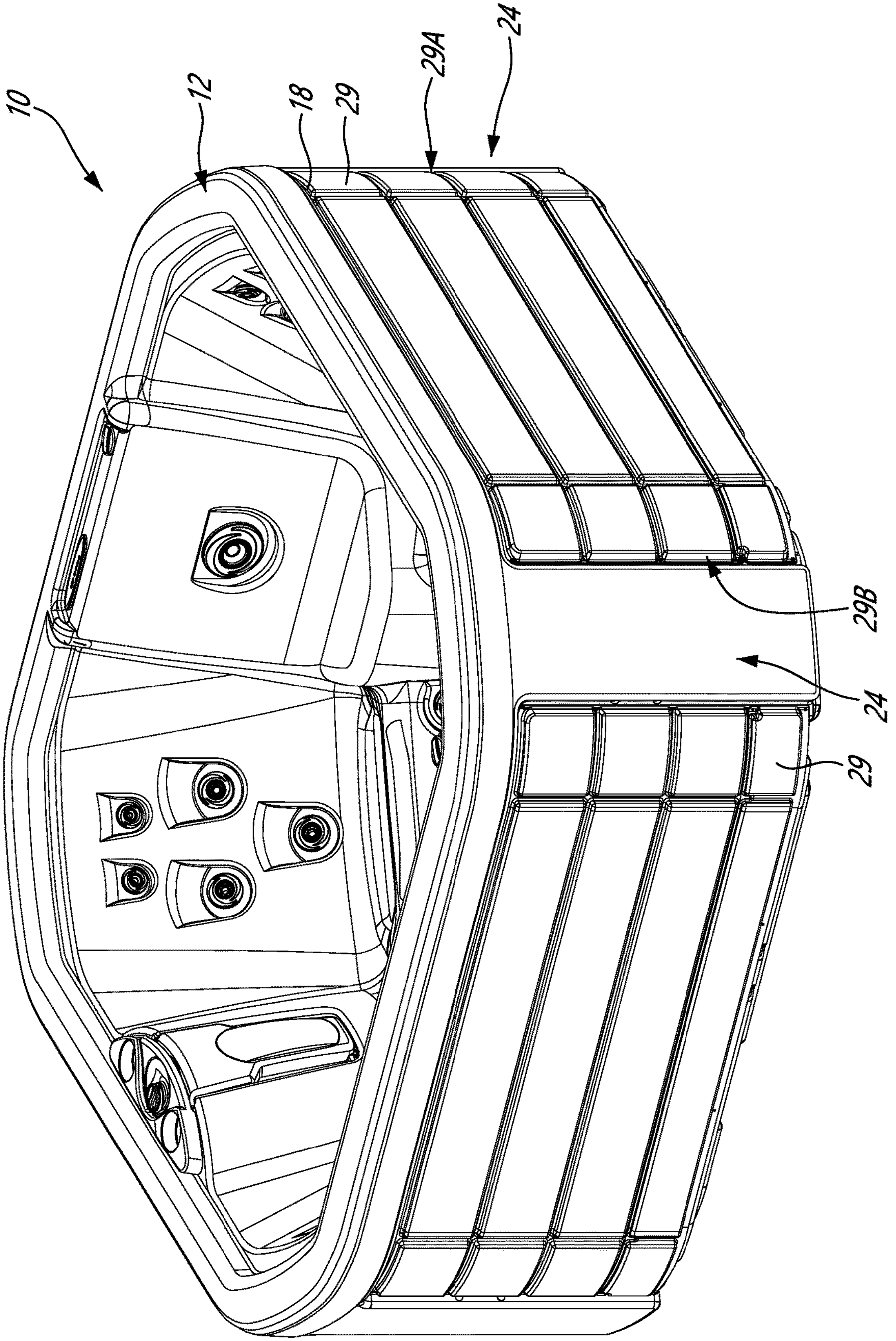
FIG. 2 is an oblique view of the spa of FIG. 1, shown with panels covering respective openings in the side portions of the spa, in accordance to one or more embodiments.

As shown in FIG. 2, the openings 26 (not apparent) are closable with panels 29 removably secured to the peripheral wall 18. In other words, the panels 29 can cover the openings 26 Such panels 29 may provide additional rigidity to the peripheral wall 18 in spite of the openings 26 defined therein. The panels 29 have a planar outer surface. In this example, the panels 29 have horizontal ribs defined therein. The opposite ends 29A of the panels 29 are curved to follow the outline of the corner portions 24. The opposite ends 29A are engaged in the receding corners 27 (not apparent) of the shell 12 (described above). Such panels 29 may have, primarily, a decorative/ornamental purpose and/or serve to close or seal the access to the cavity 28 to protect internal components, such as the equipment pack, electrical wiring, plumbing, fittings, water heater, filtration system, etc., from undesirable contaminants, objects, and/or prevent or limit access to the cavity 28 for insects, vermin, etc. For instance, in some embodiments, the panels 29 may be sealingly engaged with the windowed peripheral wall 18 for such purpose. Fasteners, such as screws, clips, etc. and/or interlocking features, for instance, may be contemplated to secure the panels 29 onto the peripheral walls 18.

In at least some embodiments, the inherent rigidity, material, and/or construction of the panels 29 may not provide enough rigidity to compensate for the removal of material to define the windowed peripheral wall 18.

As indicated above, large openings 26 in the side portions 22 may facilitate access to the cavity 28, for maintenance, installation, verification of the enclosed equipment, such as the equipment pack, electrical wiring, plumbing, fittings, water heater, filtration system, etc., which may be wholly or partially within the cavity 28. To obtain a superior structural integrity of the spa 10 and/or compensate for the structural weakening of the shell 12 which may result from the presence of such large openings 26 (weakening compared to inherent mechanical properties of a unibody shell without such openings 26), a frame enclosed within the cavity 28 is acceptable to a certain extent. However, limited space to insert such frame within the cavity 28 of the spa 10 via the openings 26 may be limiting on the size and/or geometry of such frame, and/or ease of assembly. As will be discussed below, providing a plurality of frames 30, which may together be referred to as a frame system, affixed to the unibody shell 12 and decoupled one with respect to each other, in the form of a plurality of individual frame members insertable into the cavity 28 within the shell 12 via the openings 26, may provide structure to a windowed rotomolded spa. On a manufacturing standpoint, rotomolding large shell components such as the shell 12 with a thick wall of material (e.g., polyethylene, such as high density polyethylene—HDPE) such as about ½ inches thick walls may allow a limited control a uniform thickness or a obtain a precise thickness of material at selected locations of the shell 12. Rotomolding of such a thick shell 12 may not provide a satisfying level of precision on the contemplated stiffness of the shell 12 at least in some areas, when a minimal quantity of material for manufacturing optimization is at play.

Figure 3:
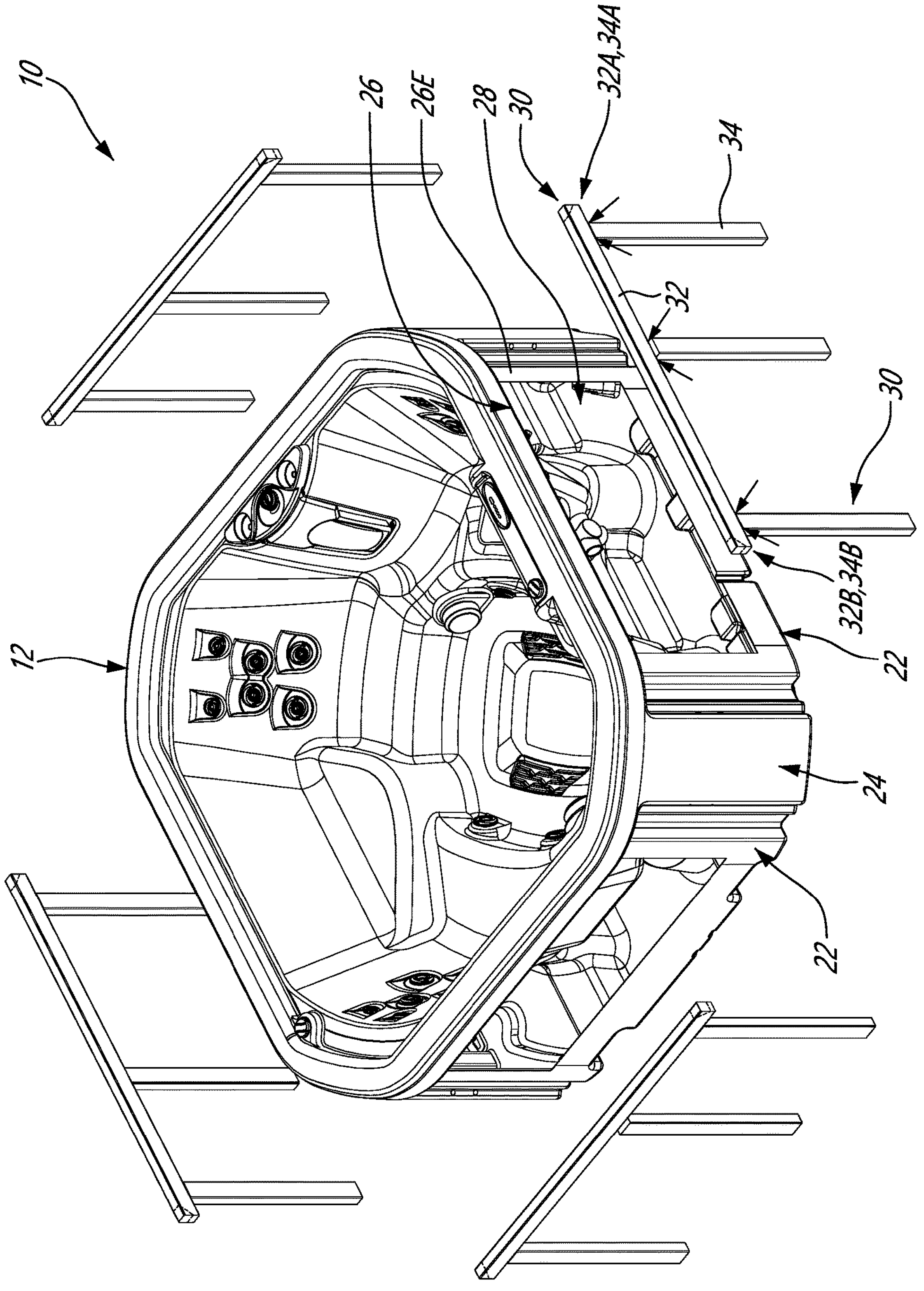
FIG. 3 is an exploded view of the spa of FIG. 1, in accordance to one or more embodiments.

Referring to FIG. 3, the unibody shell 12 includes a plurality of frames 30 within the cavity 28 of the shell 12. The frames 30 are structurally mounted within the cavity via corresponding ones of the openings 26. As can be seen, each frame 30 includes at least a crossbar 32 extending generally horizontally (e.g., at about ±5°) relative to a level floor or surface and a plurality of strut members 34, which may be referred to as posts, pillars, uprights, for instance, depending from the crossbar 32. As shown, in at least some embodiments, the strut members 34 may extend perpendicularly to the crossbar 32 (e.g., at about 90°±5°). The strut members 34 may be parallel to each other, though other relative orientation may be contemplated in other embodiments. The crossbar 32 and the strut members 34 collectively form a frame 30. Features of one such frame 30 and parts are described below.

As depicted, the crossbar 32 and the strut members 34 are sized and shaped to be insertable through the opening 26 and placed along respective edges of the opening 26. During the manufacturing of the spa 10, the crossbar 32 and the strut members 34 may be inserted individually within the cavity 28 via the opening 26, and affixed together once inside the cavity 28. Interferences and/or space constraints may limit the preassembling of the crossbar 32 and the strut members 34 before inserting them into the cavity 28 through the opening 26 in most if not all cases. The strut members 34 are affixed to the crossbar 32 so as to define a rigid connection therebetween. Such rigid connection may be obtained for instance by fasteners, adhesive, interlocking, fastening, a combination of that, or in other suitable ways. Fasteners, such as screws, nails, inserts, dowels pins, and/or adhesives may be contemplated to affix the crossbar 32 and strut members 34 to one another. The crossbar 32 and strut members 34 may also have interlocking features, complementary connectors or else, to facilitate alignment therebetween during assembly. The small arrows in FIG. 3, show suggestions of locations where between the crossbar 32 and the strut members 34 can be preferably affixed to one another. As can be seen at least in FIG. 3, the frames 30 of the frame system are not joined in between them. In other words, the frames 30 remain decoupled from one another. Still, the frames 30 are structurally mounted within the cavity 28 via a corresponding one of the openings 26. Access to the cavity 28 in the corner portions 24 to join the frames 30 together may not be possible or may be cumbersome. The frames 30 may thus be spaced apart from each other at least for this reason.

The crossbar 32 and strut members 34 are affixed together to form in combination a window frame extending along respective sides of the opening 26. As shown, two strut members 34 are positioned adjacent opposite extremities 34A, 34B of the crossbar 32. As such, the two strut members each extend from the crossbar 32 at a respective one of the first and second extremities 34A, 34B of the crossbar 32. In the example shown, the frame 30 includes more strut members 34 than lateral edges of the opening 26, as the opening 26 has two opposite lateral edges and the frame 30 has three strut members 34. As shown, a middle one of the strut members 34 can run across the opening 26. As such, the middle strut member can extend from a center of off-centre position of the crossbar 32. The middle strut member can be centered relative to the opening 26 of be off-center, depending on the embodiment. There could be more than one in other embodiments. In at least some embodiments, such one or more strut members 34 extending across the opening 26 at a distance between the lateral edges of the opening 26 may limit a bending (visually detectable or at the level of micro deformations) of the crossbar 32 when the rim portion 16 of the shell 12 is loaded and/or better distribute a load on the base 20, at more locations corresponding to the number of strut members 34.

In the illustrated embodiment, the extremities 34A, 34B of the crossbar 32 have respective beveled ends 32A, 32B. The beveled ends 32A, 32B may facilitate the insertion of the crossbar 32 in place in the cavity 28, considering various possible interferences the crossbar 32 may have during assembly in the cavity 28. For instance, the beveled ends 32A, 32B can be of use in the insertion of the crossbar 32 through the openings 26 into the cavity 28. In this particular embodiment, the crossbar 32 has a length with is greater than that of the lateral dimension OW of the openings 26. As such, the beveled ends 32A, 32B may aid in the diagonal insertion of the crossbar 32 into the cavity 28, by permitting one of the beveled ends 32A, 32B to be closer to an internal surface when the crossbar 32 is at an angle. Further details of the beveled ends 32A, 32B will be provided below. It is understood that the example use of the beveled ends 32A, 32B are not to be construed as limiting in any way and that such beveled ends 32A, 32B may be absent in at least some other embodiments.

Figure 4:
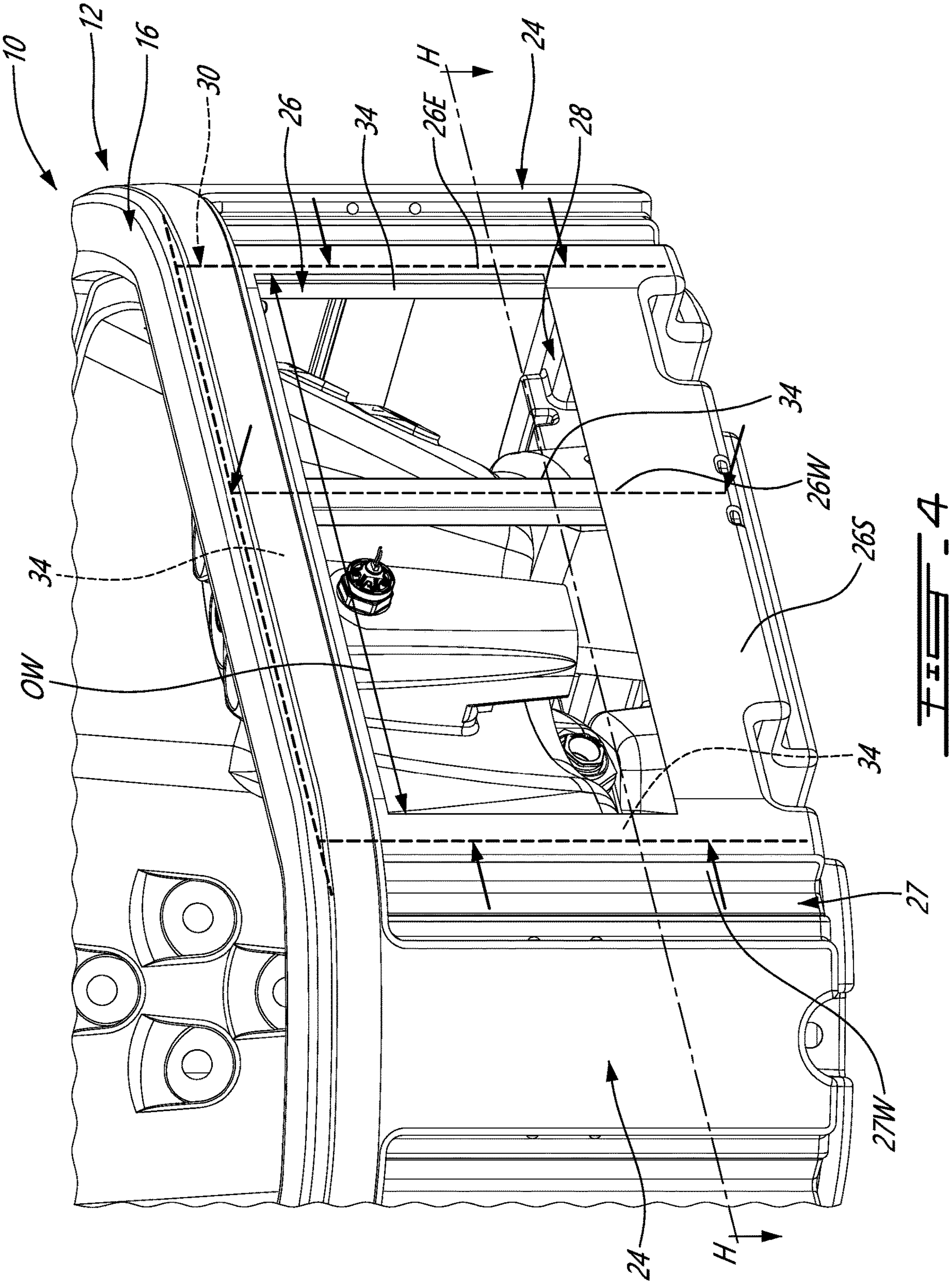
FIG. 4 is an oblique view of the side portion of the spa of FIG. 1, showing a frame in dashed lines, in accordance to one or more embodiments.

As best shown in FIG. 4, the lateral dimension OW of the openings 26 extends over a substantial portion of the side portions 22. Accordingly, the strut members 34 extending across the opening 26 may rigidify even more the rim portion 16. In other words, the frame 30 can provide a structural support for a whole side of the spa 10, between two adjacent corners 24.

As shown, the frame 30 surrounds at least partially the opening 26 defined in the side portions 22 of the spa 10. The crossbar 32 and strut members 34 are affixed together to form in combination a window frame extending along respective sides of the opening 26. The frame 30 is affixed to the shell 12. The frame 30 and portions of the shell 12 on which the frame 30 is affixed may form a composite structure, with the frame 30 and shell 12 contributing to the structural integrity of the spa 10 under load (e.g., water, users, spa cover/hood, or other external loads applied to the overall self-supporting structures of the spa 10).

As shown, the crossbar 32 runs alongside the rim portion 16. At least some of the strut members 34 extend along opposite lateral edges 26E of the opening 26. The crossbar 32 and the strut members 34 may reduce bulking, warping or other undesirable deformation of the peripheral wall 18 extending around the opening 26, for easier installation and/or better fit of the panel 29 (not shown in FIG. 4) onto the peripheral wall 18. Planarity of a contact interface between the panel 29 and the peripheral wall 18 may be more consistent over time by the increased rigidity of the peripheral wall 18 about the opening 26 via the frame 30.

Figure 5:
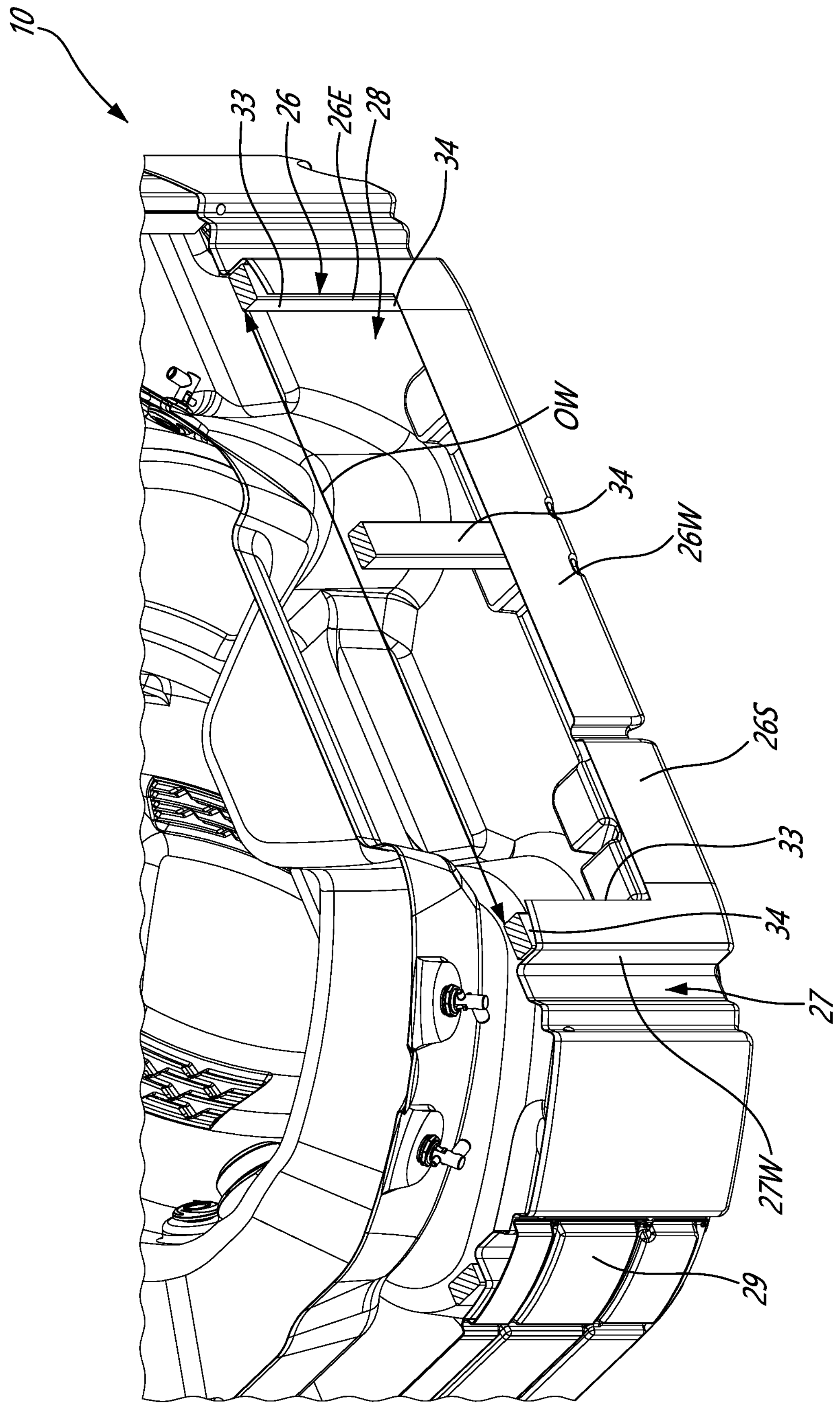
FIG. 5 is a cross-sectional view the spa of FIG. 1, taken along plane H-H of FIG. 4, in accordance to one or more embodiments.

The strut members 34 are affixed to the shell 12 at one or more location thereof. The arrows on FIG. 4 show exemplary locations where the strut members 34 may be affixed to the shell 12. Broadly put, the crossbar 32 and the strut members 34 are preferably affixed to the shell 12 at locations distributed about the respective opening 26. In this example, the crossbar 32 can be abutted against an inner surface of the rim portion 16 of the shell 12. Fasteners, such as screws may be used to affix the strut members 34 to the shell 12 in at least some embodiments. Other fasteners, such as nails, and/or adhesives may be contemplated. Affixing may be made over a surface area, with an adhesive, instead of or in addition to punctual locations such as with fasteners. Referring to FIG. 5, which shows a cross-section of the spa 10 taken in a horizontal plane such as shown at section H-H of FIG. 4, affixing of the strut members 34 extending along lateral edges of the opening 26 may be made between a upwardly extending wall 27W of the receding corners 27. Those strut members 34 may contact or extend in proximity with such wall 27W, rendering such wall 27W one possible affixing interface with the frame 30. A wall 26W defining the flat surface 26S of the window frame surrounding the opening 26 may also be another possibility, in addition to or instead of the wall 27W. However, in some cases, such as shown, such wall 26W may not be close enough from a side surface of the strut member for affixing thereto. In FIG. 4, the strut member extending across the opening 26 in a top-to-bottom direction is affixed at opposite ends thereof, on the wall 26W defining the flat surface 26S of the window frame surrounding the opening 26. In embodiments where fasteners are used, the strut member extending across the opening 26 in a top-to-bottom direction extends through the flat surface 26S and the fasteners affixing the strut members 34 to the upwardly extending wall 27W of the receding corners 27 may extend through such wall 27W. While the use of fasteners extending through surfaces of the shell 12 may make an unappealing look viewed from the exterior, such area may be entirely covered by the panel 29 so as to hide all fasteners, as can be seen in FIG. 5.

It may be desirable to minimize a distance between the strut member and the lateral edge 26E of the opening 26. Still referring to FIG. 5, the strut members 34 along the lateral edges of the opening 26 are slightly outwardly offset away from the lateral edge 26E on the sides of the opening 26. In other embodiments, an inner face of the strut members 34 may coincide and align with the lateral edge 26E on the sides of the opening 26. In all cases, the strut members 34 are placed within the cavity 28 adjacent to the flat surface 26S surrounding the opening 26 and extending along the height H of the spa. As depicted, the strut members 34 are substantially hidden from a viewer looking through the opening 26 into the cavity 28. In some embodiments, inner sides 33 of the strut members 34, facing each other on opposite sides of the opening 26, are aligned with the lateral edge 26E of the sides of the opening 26, extending generally vertically along the height H of the spa. In at least some embodiments, the distance between the strut members 34 on the sides of the opening 26 may be smaller than 110% of the lateral dimension OW of the opening 26. In another embodiment, the distance between the strut members 34 along the lateral edges of the opening 26 is about 1.005 times the lateral dimension OW of the opening 26. In some embodiments, this may correspond to a minute offset between the side of the strut member and the lateral edge 26E of the opening 26.

Figure 6:
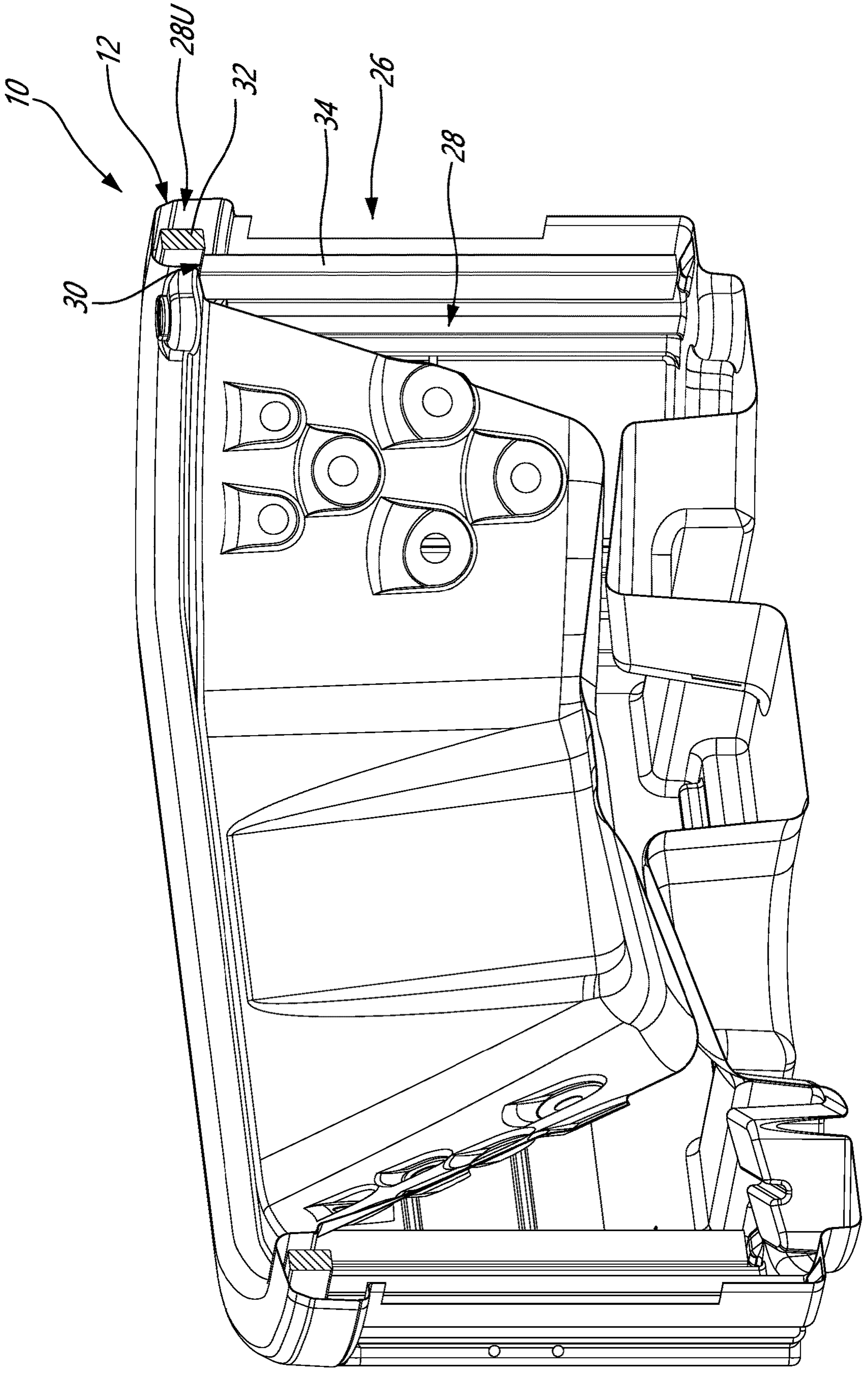
FIG. 6 is a cross-sectional view of the spa of FIG. 1, taken along plane V-V of FIG. 1, in accordance to one or more embodiments.
Figure 7:
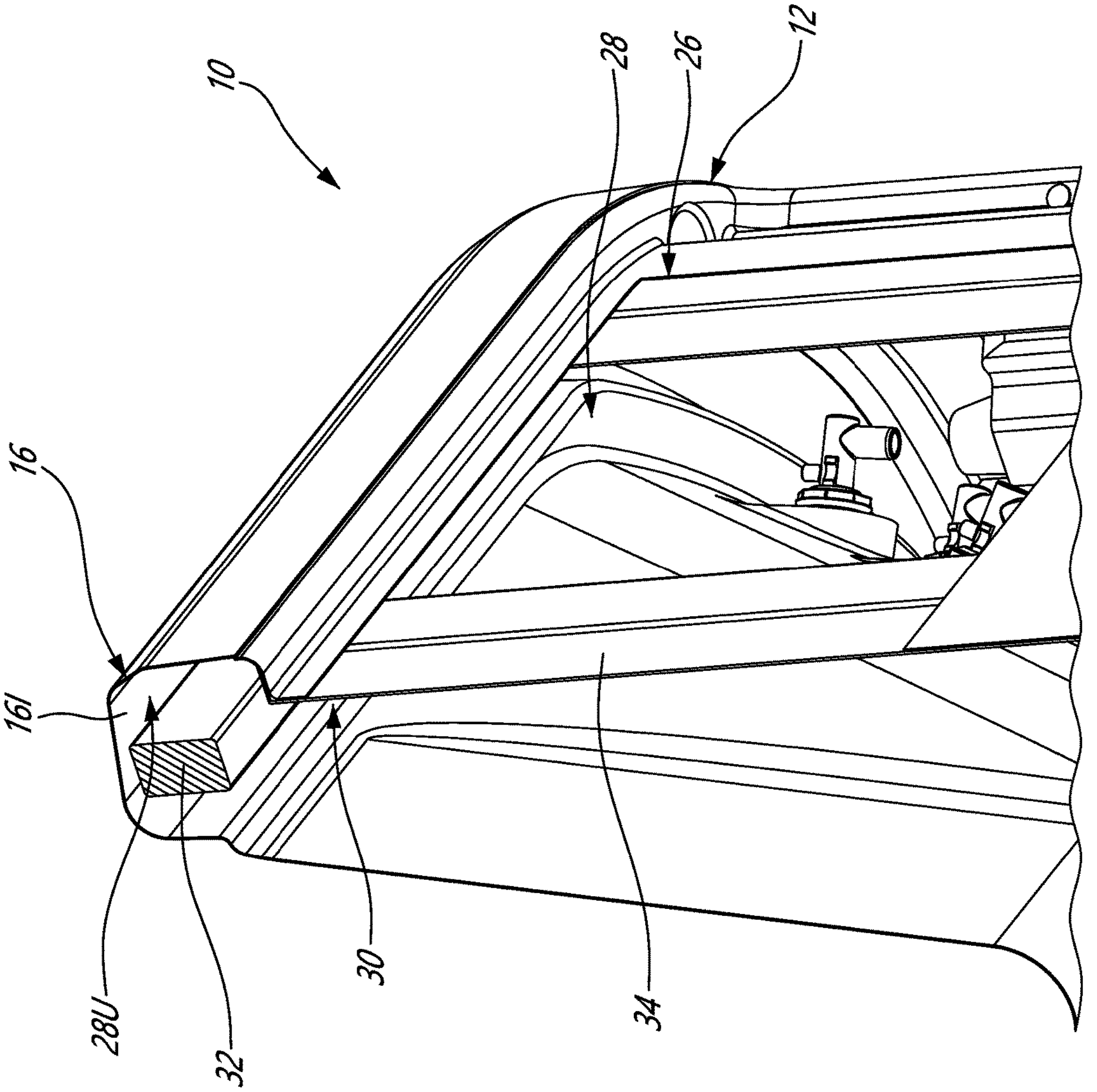
FIG. 7 is a sectional view of a top of the spa of FIG. 1, showing an abutment between a crossbar and an interior of a rim portion of the spa, in accordance to one or more embodiments.

Referring to FIGS. 6 and 7, the crossbar 32 and strut members 34 of respective frames 30 on opposed sides of the spa 10 are partially shown. As described above, the crossbar 32 and the strut members 34 extend along a respective sides of the openings 26. In at least some embodiments, the crossbar 32 contacts an inner surface 161 of the rim portion 16 facing the cavity 28. The crossbar 32 may maintain or contribute to the planarity of the rim portion 16 of the shell 12, in embodiments where the panels 29 and/or the rim portion 16 may not provide enough structural integrity to the shell 12 about the openings 26. Such planarity may provide a better sealing between the spa cover/hood on the rim portion 16 and/or support additional load which may result from snow or ice accumulations on the spa cover/hood during winter use, for example. There may be a gap therebetween in other embodiments to allow for a difference in thermal expansion of the material of the shell 12 and the frames 30, in embodiments where the thermal expansion and/or material of the shell 12 and frames 30 are different.

As shown in FIG. 6 and also referring to FIG. 7, the crossbar 32 is adapted to be lodged in a space 28U of the cavity 28 defined above the opening 26, within the rim portion 16. More specifically, the crossbar 32 is abutted against an inner surface 161 of the rim portion 16 of the shell 12. The crossbar 32 may be located closer to an upper edge of the opening 26 in other embodiments, as another possibility. In embodiments where the dimensions of the crossbar 32 may permit, the crossbar 32 may contact the inner surface 161 of the rim portion 16 and also extend close to the top edge of the opening 26, such as described above with respect to the strut members 34.

Figure 8:
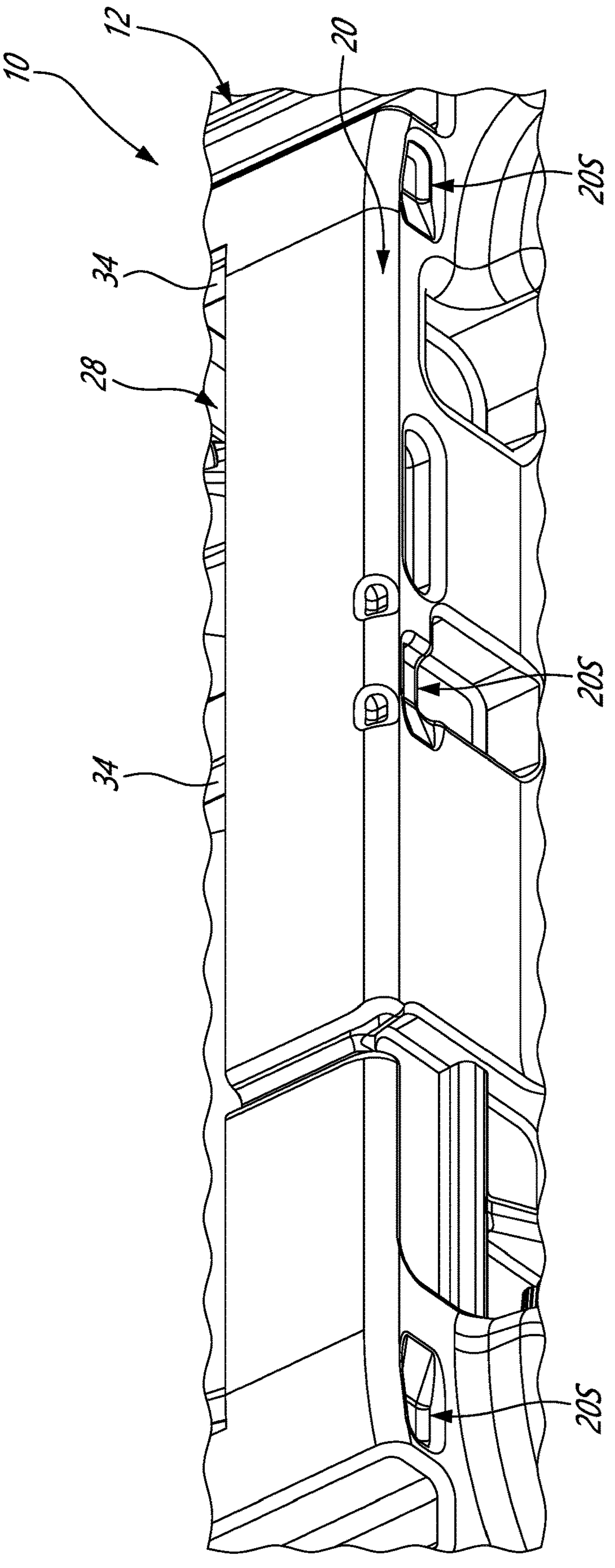
FIG. 8 is an oblique view of a portion of a base of the spa of FIG. 1, viewed from the outside of the spa, showing inwardly protruding seat portions, in accordance to one or more embodiments.
Figure 9:
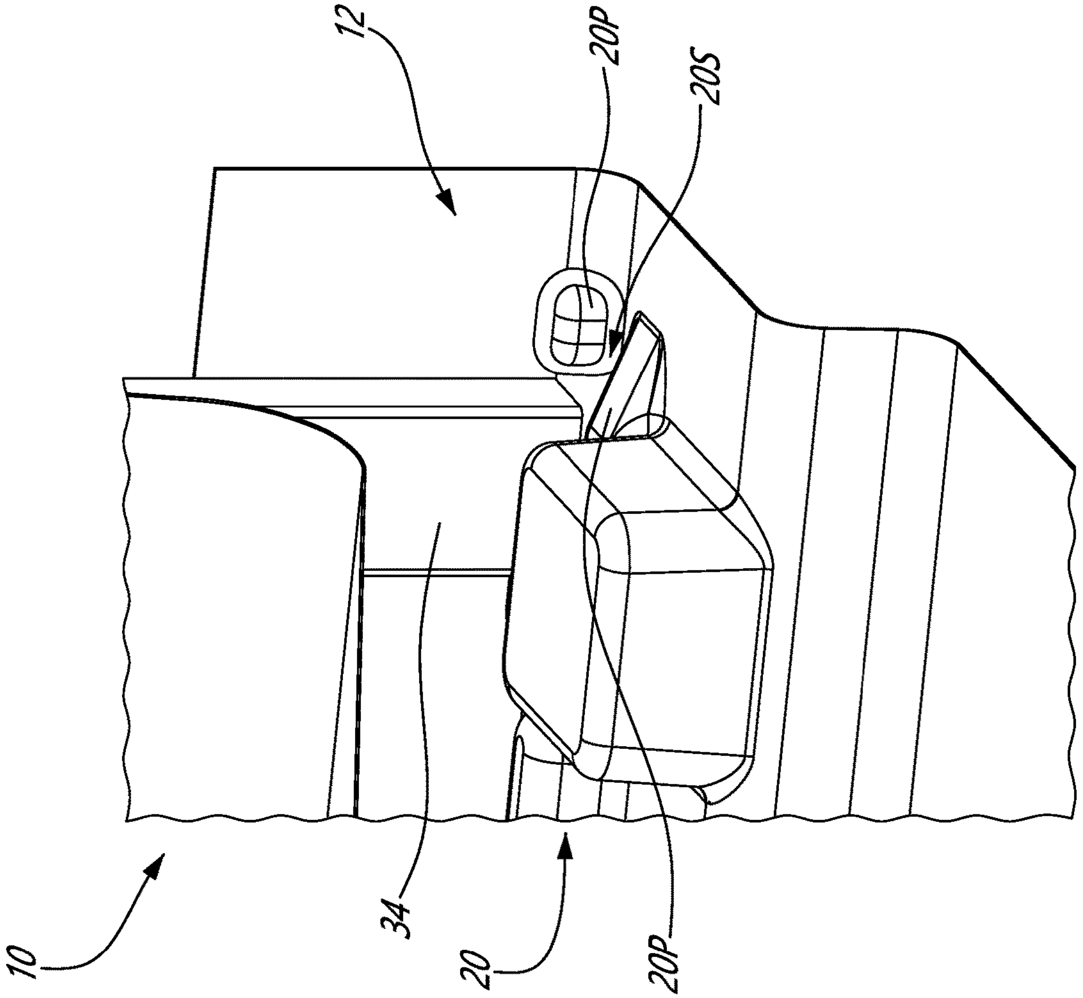
FIG. 9 is a sectional view of the base of FIG. 8, viewed from the inside of the spa, in accordance to one or more embodiments.

Referring to FIGS. 8 and 9, there is shown seat portions 20S defined in the base 20 of the shell 12 to receive a portion of the strut members 34, and more specially bottom ends of the strut members 34. As shown from underneath the base 20 in FIG. 8, the seat portions 20S are provided in the form of inwardly protruding bulges or pockets also referred as protrusions 20P defined in the shell 12 and extending inwardly towards the cavity 28. Such seat portions 20S may serve as positioning means for the bottom ends of the strut members 34. The seat portions 20S may provide greater stability of the bottom ends of the strut members 34 relative to the base 20, greater local stiffness of the base 20 at the interface between the base 20 and the strut member 34, and/or contribute to a better load distribution from the strut members 34 to the base 20. The seat portions 20S may also better maintain a parallelism between adjacent strut members 34. FIG. 9 shows the seat portion 20S of the strut member 34 extending across the opening 26, viewed from an interior of the cavity 28. As shown, the protrusions 20P are bulge portions of the shell 12 located on at least two sides of the strut member 34 to support and surround at least partially the bottom end thereof. This is an example only, as the seat portions 20S may have a different shape, and/or have more or less protrusions 20P in other embodiments.

Figure 10:
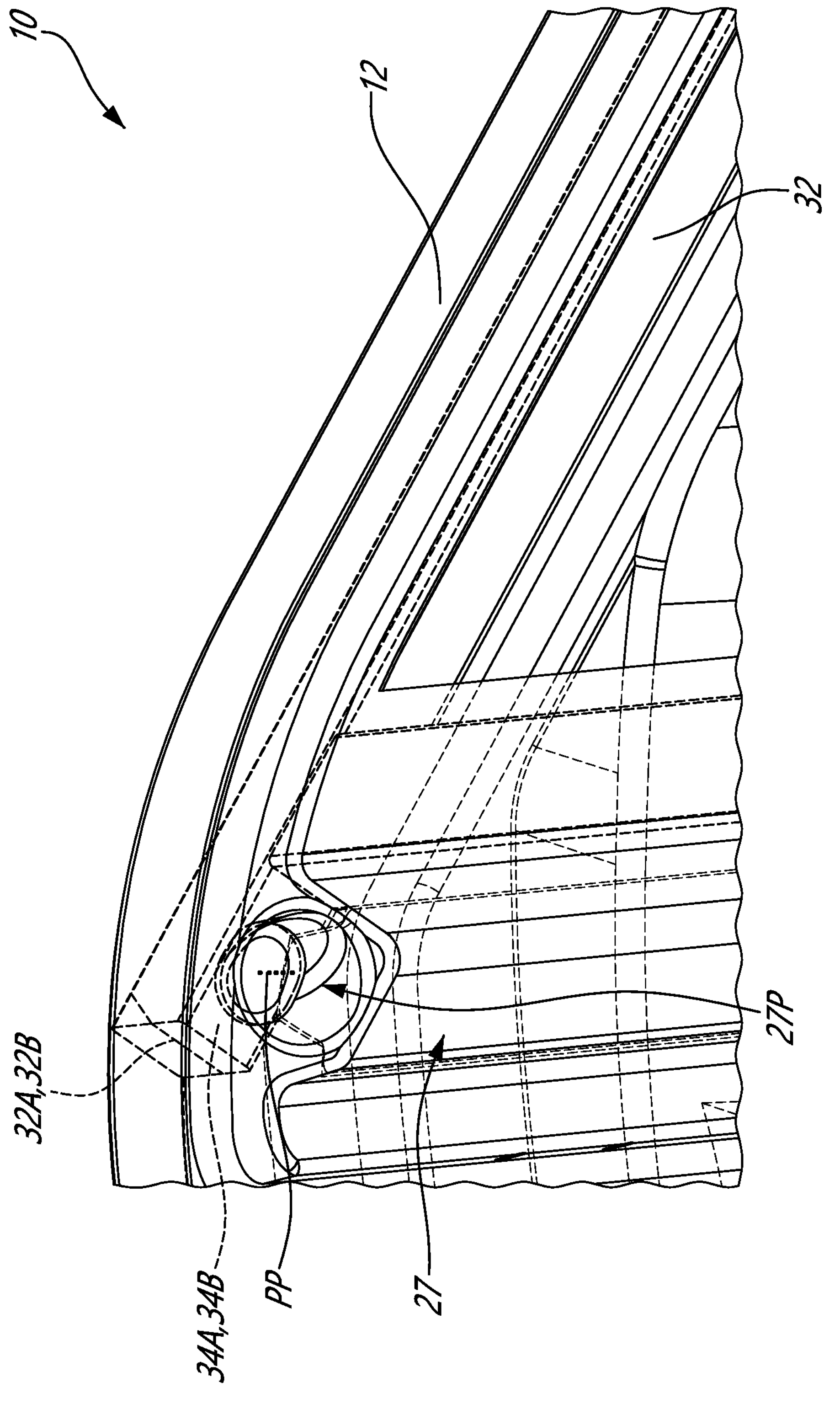
FIG. 10 is an oblique view of a corner portion of the spa of FIG. 1, with transparency applied to features to show a hidden component, in accordance to one or more embodiments.

Referring to FIG. 10, pockets 27P are defined in the shell 12 to receive fasteners to affix the crossbar 32 to the shell 12. Such pockets 27P are located in corner portions 24 of the spa 10 to cooperate with the crossbar 32 adjacent opposite extremities 34A, 34B of the crossbar 32. The pockets 27P are opened to face downwardly. A projection PP extending from an end of the pockets 27P extends within the receding corners 27. The fasteners affixing the crossbar 32 to the shell 12 may thus be recessed so as to be unapparent for a general observer, even if the panels 29 are removed from the side portions 22 of the spa 10. In other embodiments, the crossbar 32 may be a floating crossbar 32, not affixed to the shell 12 and/or only affixed to the strut members 34.

In this embodiment, the crossbar 32 has a constant cross-section along its length. However, in alternate embodiments it can be advantageous for the crossbar 32 to have the beveled ends 32A, 32B previously discussed above. In FIG. 10, the beveled edges 32A, 32B are shown by the cut which would have been made to the crossbar 32. The beveled edges 32A, 32B permit the insertion of the crossbar 32 further into the corner portion 24 of the spa 10, by avoiding that a portion of the opposite extremities 34A, 34B, be subject to undesirable constraints of the curving top portion of the shell 12, while further maintaining its capacity to interface with the pockets 27P of the receding corners 27.

The crossbar 32 and the strut members 34 may be hollowed or plain, have same or different cross-section shape and/or size, depending on the embodiments. Although shown as plain rectangular cross-section beams in this example, they may have alternate cross-sectional shapes, in other embodiments, such as H-shaped cross-sections, I-shaped cross-sections, T-shaped cross-sections, L-shape cross-sections, C-shape cross-sections, U-shaped cross-sections, circularly-shaped cross-sections, pipe-shaped cross-sections, etc. Further, it can be understood that alternate materials to dimensional lumber, such as thermoplastics, plastic composites, composite wood, metal beams, matrix composites, steel, aluminum, etc., can be used without departing from the present disclosure.

There may be additional rigidifying members, interconnecting the crossbar 32 to the strut members 34, such as jambs, couplings, elbows, for example. More than one crossbar 32 per frame 30 may be contemplated in other embodiments. For instance a frame 30 may have a crossbar 32 adapted to be lodged within the rim portion 16, and another crossbar 32 extending along a bottom edge of the opening 26 and/or along the base 20. This may provide even more rigidity to the windowed peripheral wall 18 in at least some embodiments.

Figure 11:
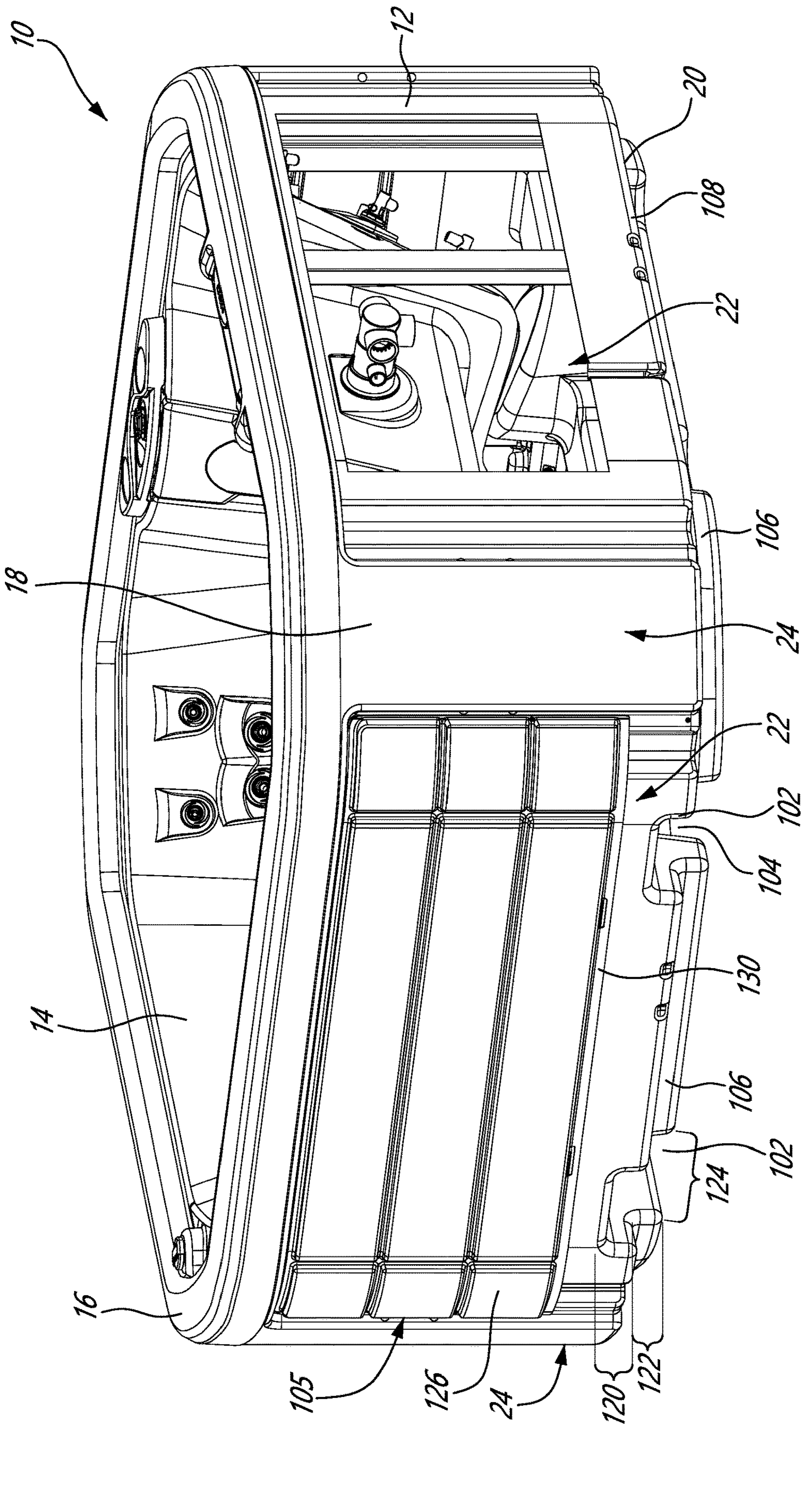
FIG. 11 is an oblique view of a spa having a side portion to which a main panel is engaged thereby exposing channels and a peripheral recess of the side portion, in accordance with one or more embodiments.
Figure 17:
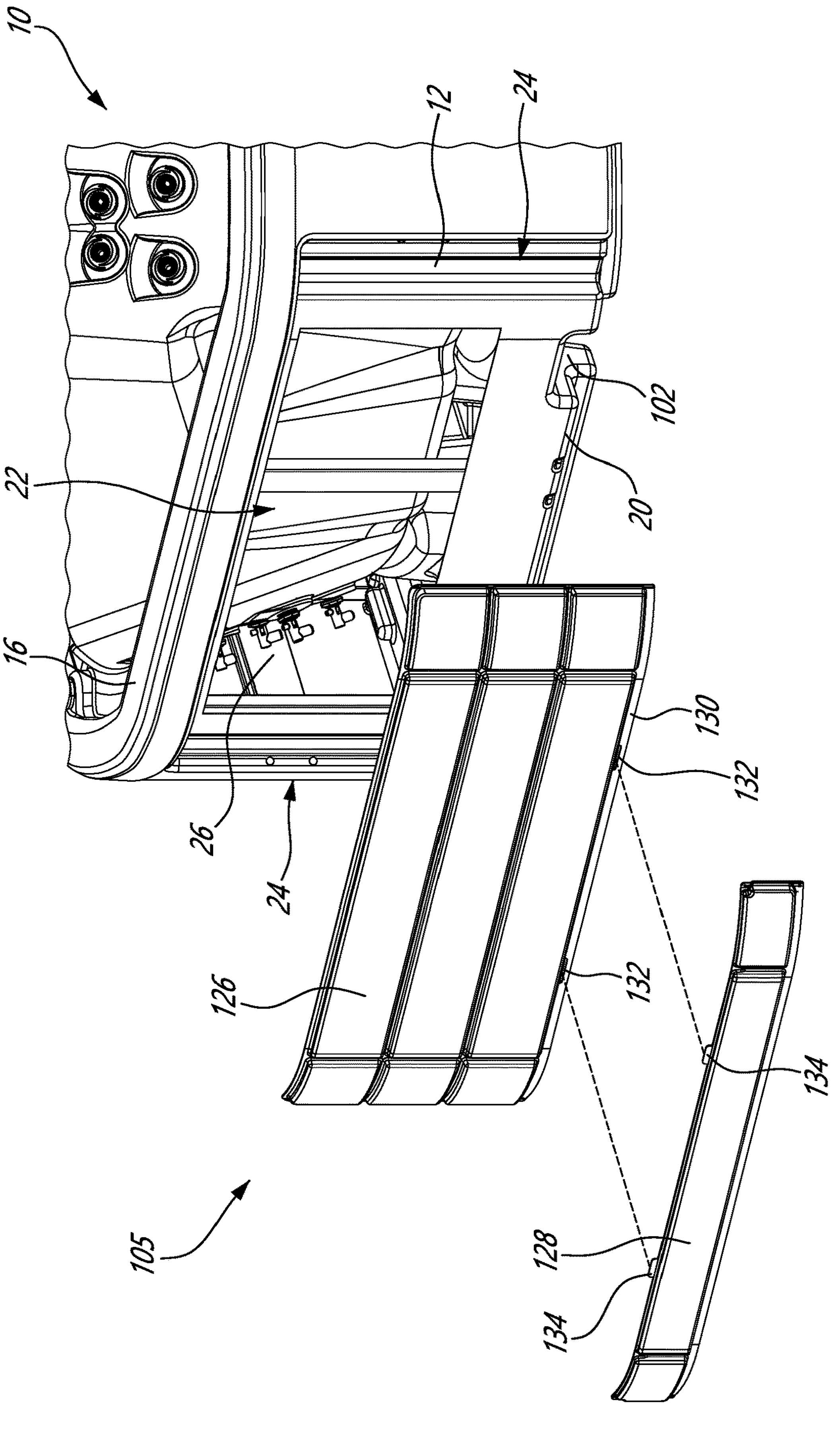

Referring now to FIG. 11, the base 20 of the spa 10 contains channels 102 which form part of the unibody shell 12. The channels 102 extend longitudinally between two opposite side portions 22 of the peripheral wall 18, along the base 20. The channels 102 are generally parallel to one another, and are sized and shaped to receive conventional forklift forks. In this embodiment, the channels 102 are separate and distinct from one another. In other embodiments, the channels may be provided in the form of parallel edges of a large, single canal recessed in the base towards the cavity. The channels 102 can be seen as extending along the length or width of the spa 10. However, it is understood that the channels 102 can extend in any other direction, such as obliquely to the length or width, for instance. In this embodiment, the channels 102 are symmetrically placed along the width of the spa, on opposite lateral sides. However it is understood that in alternate embodiments, the channels 102 can be asymmetrically along the width (or length, should they extend longitudinally along the width).

Each one of the channels 102 forms a respective forklift engagement channel which extends under the base 20. As the base 20 abuts with the floor when the spa 10 is set, the channels 102 form a closed passage between the channels 102 of the base 20 and the floor itself. As is perhaps best seen in FIG. 11, the spa can have only part of a modular panel 105 placed on one of the side portions 22. The modular panel 105 has a main panel 126 which is engaged on a side portion 22 of the spa 10. As shown, the modular panel has a main panel covering the opening of a side portion 22 while exposing the channels 102. The modular panel also has a subpanel (not shown in FIG. 11) engageable to the main panel and covering at least partially the pair of channels 102. Another part of the modular panel 105, referred to as subpanel, may be used to cover the bottom part of the side portion 22, and more specifically hide the channels 102, as will be described below. As shown, the channels 102 extend entirely between two opposite corner portions 24 of the peripheral wall 18. The channels 102 thus form apertures 104 in the peripheral wall 18 which are visible in absence of a subpanel. These apertures 104 provide ingress for the forks of a forklift, for instance, to be received within the channels 102 such that the forklift forks may be used to displace the spa 10. It is understood that, in alternate embodiments, the channels 102 may extend only partially from a first side portion of the spa without departing from the present disclosure. For instance, in an alternate embodiment, the channel can extend from a given side portion of the spa ¾ of the length or width of the spa, for instance. In other words, the channels 102 may or may not be through channels. In embodiments in which the channels are through, the channels may extend from a first side portion of the peripheral wall to a second side portion opposite the first side portion. In these embodiments, the channels may be exposed at both the first and second side portions.

As depicted, for each one of the side portions 22, a peripheral recess 106 is provided between the base 20 and the peripheral wall 18 of the spa 10. The peripheral recess 106 is sized and shaped to be snugly abutted against a rim portion of another spa, when stacked. The peripheral recess 106 forms a base edge 108 extending inwardly from the peripheral wall 18 towards the basin 14, under the peripheral wall 18, before extending generally vertically, approximately parallel to the corresponding section of the peripheral wall 18 towards the generally flat structure of the base 20. It is understood that the dimensions (length and width) of the base 20 are smaller in comparison to the outer dimensions of length and width of the spa 10. As depicted, the channels 102 have dimensions which forms apertures 104 extending in both the peripheral wall 18 and the peripheral recess 106. As shown, the channels 102 may extend through the peripheral recess 106 of a corresponding side portion.

Still referring to FIG. 11, the channels 102 have dimensions which permit receiving standard forks of a commercial forklift. The height of the channels 102 can further be divided into a clearance height 120 and a penetration height 122. The clearance height 120 extending from an upper surface of the channel 102 up to a level of the peripheral recess 106. The penetration height 122 extends from the level of the peripheral recess 106 to a bottom level of the channel 102. It is desirable for the clearance height 120 of the channels 102 to be larger than a thickness of the forks of the forklift. In this way, sufficient space is provided for the forks to be disengaged from the channels 102 of the spa 10 even when the spas are stacked. As the peripheral recess 106, and its respective penetration height 122, is received within an underneath spa, the forks should be able to engage and disengage without accounting for the penetration height 122. The clearance height 120, in this embodiment, is approximately 10 cm. It is understood that in alternate embodiments, the clearance height 120 can be of any value needed for the spa 10 to be engageable via the channels 102 with a corresponding forklift or other lifting means. For instance, it can be desirable for the clearance height 120 to be between 15 cm and 3 cm, and more preferably between 10 cm and 5 cm, such as 5.5 cm, 7 cm or 8 cm, for instance. The penetration height 122, in this embodiment, is approximately 10 cm, but it is understood that this value can be varied without departing from the present disclosure. For instance, in an alternate embodiment, the penetration height is between 20 cm and 2 cm, more preferably between 15 cm and 5 cm. The channels 102 have a width 124 of approximately 20 cm in this embodiment, but may be of any value necessary to permit receiving the forks of a corresponding forklift (which may be of any class). For instance, in alternate embodiments, the width 124 of the channels 102 can be between 5 cm and 20 cm, and more preferably between 16 cm and 10 cm, such as approximately 10.1 cm, 12.7 cm or 15.2 cm, for instance. It is understood that the dimensions of the channels 102 identified above are examples only and that the dimensions may be altered to receive alternated forks without departing from the present disclosure.

As is perhaps best seen in FIG. 12, the main panel 126 is a part of a modular panel 105 which is configured to be engaged on the corner portions 24 of the spa 10. In this embodiment, the main panel 126 is engageable with the unibody shell 12 as described above, such as to cover the opening 26 of a side portion 22 and further provide a structure on which a subpanel 128 can be engaged. It is intended that the main panel 126 extends along the height of the spa, covering the entire opening 26 of the side portion 22 of the spa 10, yet is cut short at the lower portion of the spa 10, proximal to the base 20. The exposed portion of the base 20 provide accessibility to the channels 102, which may be used for transportation and/or storing of the spa 10. More specifically, in this embodiment, the bottom edge 130 of the main panel 126 is recessed with respect to the rest of the main panel 126 and is placed just above the channels 102 or the apertures 104 made by the channels 102. While the main panel 126 covers the opening 26 and most of the side portion 22 of the spa 10, it does not obstruct the channels 102, which can permit the spa 10 to nevertheless be manipulated/transported with forklift forks via the respective channels 102 without having to remove and/or independently transport said main panel 126. The main panel 126 can have lateral edges each having mating engagements which are engageable to complementary mating engagements of the corner portions.

Still referring to FIG. 12, the main panel 126 has a mating engagement and the subpanel 128 has complementary mating engagement engageable to the mating engagement of the main panel 126. For instance, the mating engagement may be provided in the form of slits or tabs. For instance, the recessed bottom edge 130 has a pair of slits 132 formed therein configured to receive corresponding tabs 134 of the subpanel 128. The subpanel 128 is removably engaged with the main panel 126 by tilting the subpanel 128 such that it forms an angle with the engaged main panel 126, inserting the tabs 134 of the subpanel 128 into the slits 132 of the main panel 126, tilting the subpanel 128 having its tabs 134 received within the slits 132 such as to reduce the angle between the subpanel 128 and the main panel 126, until the subpanel 128 is flush with the main panel 126 and forming an extension thereof. It is understood that other mating means may be used engage the subpanel 128 to the main panel 126 without departing from the present disclosure. For instance, in an alternate embodiment, a single slit 132 and tab 134 may be provided in the centre of the main panel 126 and of the subpanel 128. In yet another embodiment, more than two slits 132 and tabs 134 may be provided for mating engagement. In yet another embodiment, clipping means are used to engage the subpanel 128 to the main panel 126.

Figure 13:
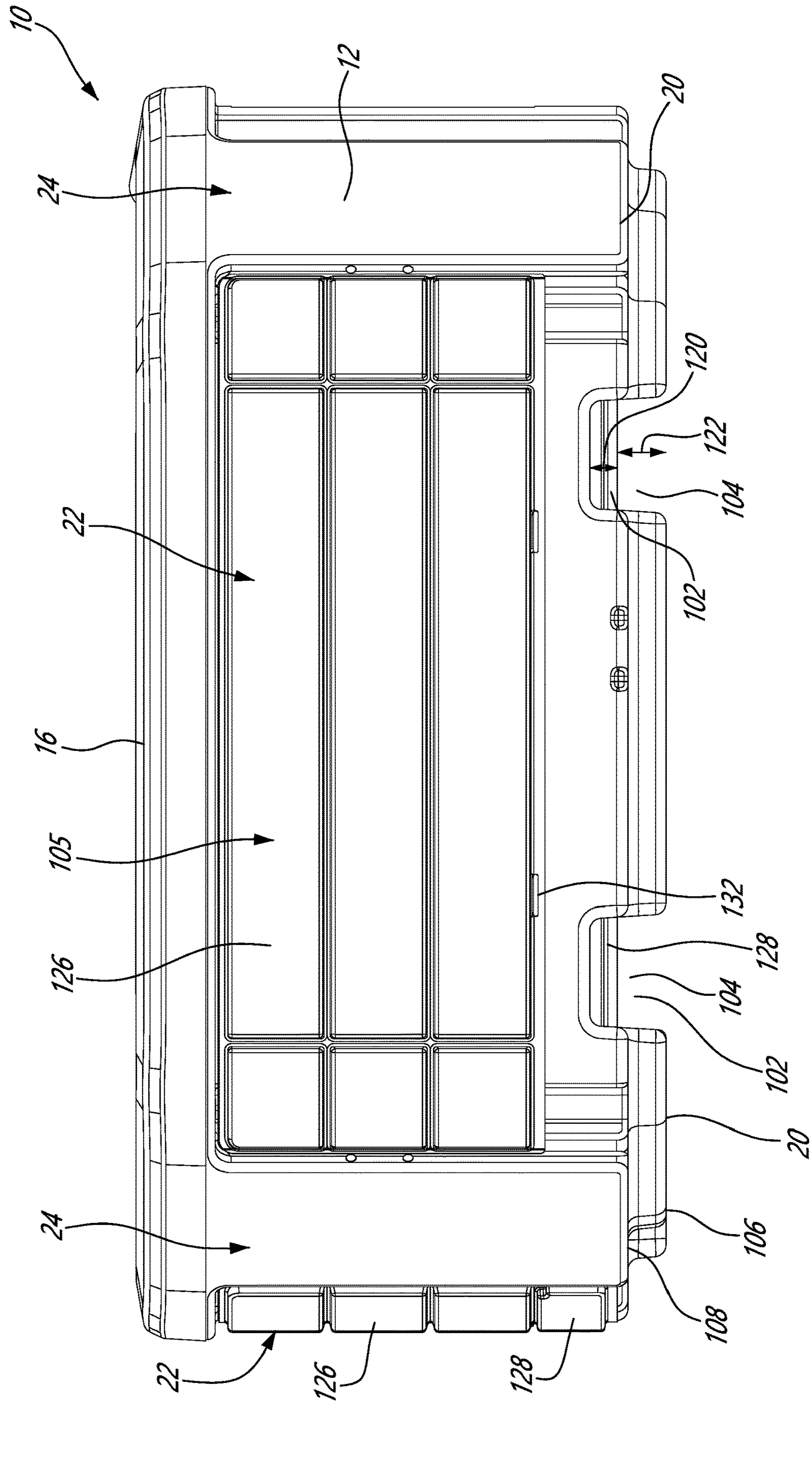
FIG. 13 is a side view of the spa of FIG. 12, in accordance with one or more embodiments.

Turning now to FIG. 13, showing a side view of the spa with the side portion 22 of the spa 10 having only the main panel 126 engaged, while the left-hand side portion 22 (mainly hidden by the body of the spa 10), has both the main panel 126 and the subpanel 128 engaged. As shown, the spa 10 has a side portion sandwiched between two corner portions 24. It can also be said that the peripheral wall has side portions interspersed with corner portions. As can be seen through the channels 102, the subpanel 128 extends towards the base 20 of the spa 10 over a portion of the channels 102 and the apertures 104 made in the side portion 22 of the spa 10. In other words, the subpanel 128 may cover only partially the channels 102 and corresponding apertures 104. In this particular embodiment, the subpanel 128 is configured to extend over a clearance height 120 of the spa 10 while not obstructing a penetration height 122. In this way, the peripheral recesses 106 of an above spa can still be stacked to the rim portion 16 of an underneath spa. However, as the subpanel 128 obstructs at least partially the upper portion of the channels 102, forks of a forklift may engage to channels 102 of a side portion where no subpanel is present. It is understood, however, that the subpanel 128 can be configured to extend over any desirable height of the spa. For instance, in an alternate embodiment, the subpanel can extend between the main panel and the base, providing no additional gap with the floor when the spa is laid on said floor. In yet another alternate embodiment, the main panel can cover only a portion of the opening of the side portion of the spa, and the subpanel can extend over the remaining uncovered portion of the opening as well as a portion of the channels.

As will be understood, as the channels 102 extend between two opposite side portions 22 of the spa 10 in this embodiment, the complementary side portions 22 of the spa do not have corresponding apertures 104 formed. Nevertheless, a corresponding modular panel 105 can be used, where a main panel 126 covers the openings 26 and a subpanel 128, extending below the main panel 126 is engaged with the main panel 126. This can be desirable to provide continuity in the way the spa 10 looks once fully assembled, where each one of the side portions 22 would have a similar look. It is understood, however, that in alternate embodiments, the panels of the complementary side portions 22 of the spa 10 (i.e., the side portions 22 which do not have the channels 102 extending therefrom, and thus none of the apertures 104), may be unitary pieces providing a corresponding visual appearance, with no subpanel, without departing from the present disclosure.

Figures 14A, 14B, 14C, 14D:
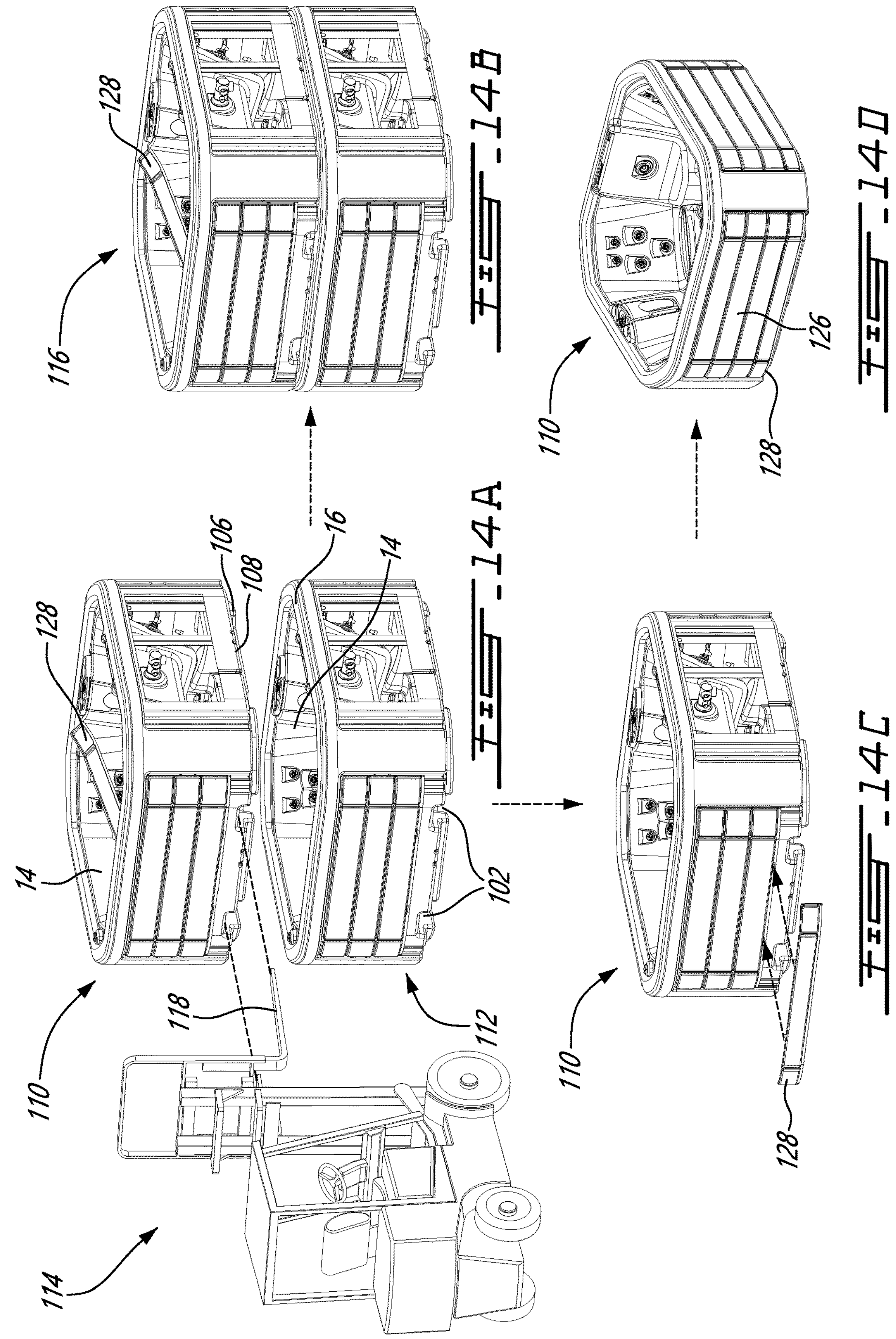
FIG. 14A is a perspective view of a forklift stacking a spa over another, in accordance with one or more embodiments.
FIG. 14B is a perspective view of stacked spas after the stacking of FIG. 14A, in accordance with one or more embodiments.
FIG. 14C is an oblique view of one of the spas of FIG. 16B, showing a subpanel in an exploded view, in accordance with one or more embodiments.
FIG. 14D is an oblique view of the spa of FIG. 16C, with the subpanel engaged to the spa, in accordance with one or more embodiments.

Attention is now brought to FIGS. 14A and 14B showing perspective views of a first spa 110 being stacked above a second spa 112 identical to the first spa 110, and the resulting stack 116, respectively. As can be seen in FIG. 14A, forks 118 of a forklift 114 are engaged with the channels 102 of the first spa 110 for its transportation. The first spa 110 is vertically aligned above the second spa 112 via the forklift 114, and then brought down onto the top portion of the second spa 112 such that the base 20 of the first spa 110, which is smaller in width and length in contrast to the net width W and length L of the spa 110 (via the peripheral recess 106) is partially received within the basin 14 of the second spa 112. The base edge 108 of the first spa 110 abuts on the rim portion 16 of the second spa 112. The resulting stack of spas 116 is perhaps best seen in FIG. 14B. The combination of the abutting base edge 108 and the peripheral recesses 106 provide an engagement between the first spa 110 and second spa 112, restricting lateral movement between the two spas 110 and 112, while further reducing the net amount of vertical space taken by the stacked spas 110 and 112 as the base 20 of the first spa 110 is snugly received within the basin of the second spa 112.

Figure 15:
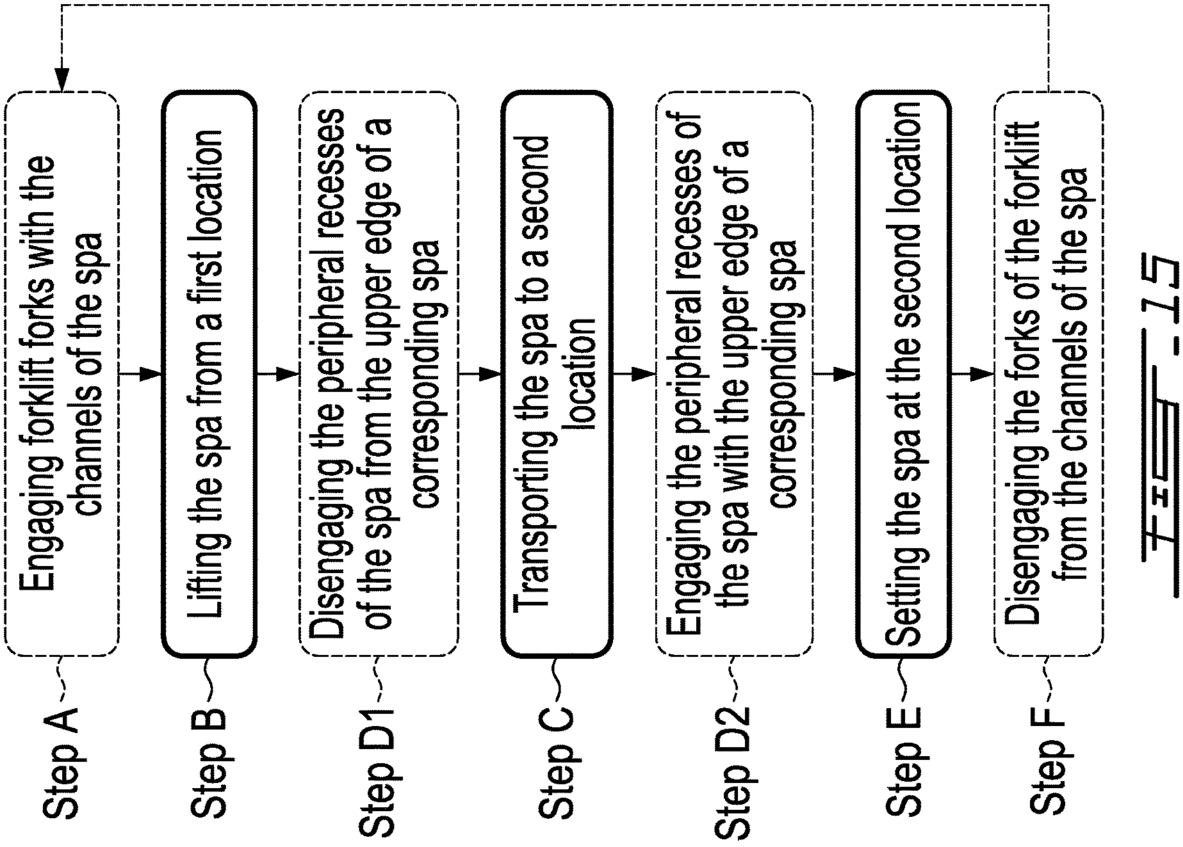
FIG. 15 is an example flow chart of a method of handling a spa, in accordance with one or more embodiments.
Figure 16:
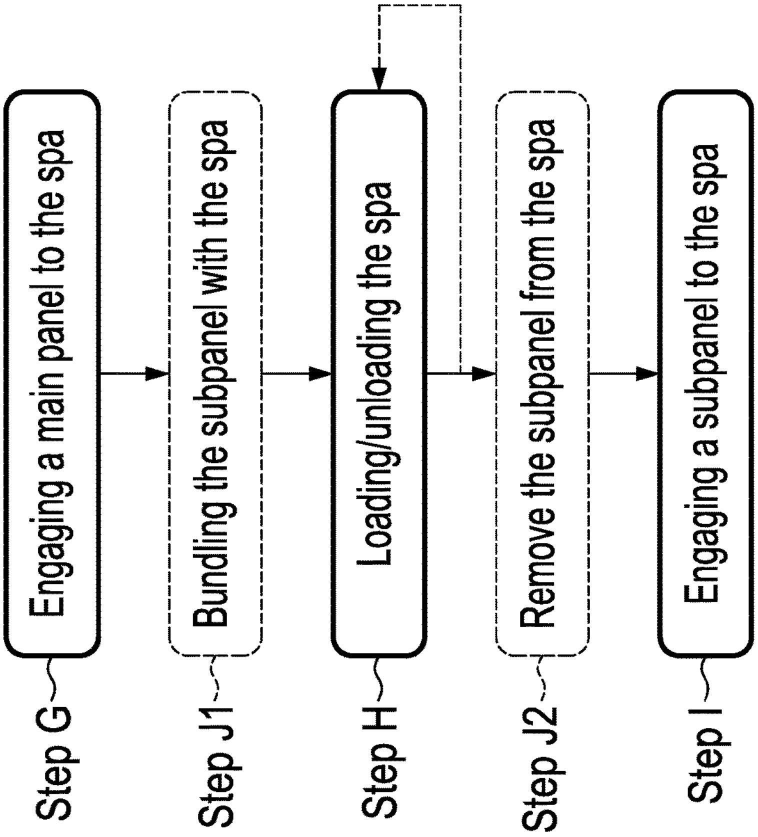
FIG. 16 is an example flow chart of a method of engaging a modular panel during handling of a spa, in accordance with one or more embodiments.

Attention is brought to FIGS. 15 and 16 showing a method of handling a spa and a method of engaging a modular panel onto a spa, respectively. These methods are discussed in relation to the loading and unloading of the spa from a manufacturing facility to a delivery destination for the purposes of clarity. However, it is to be understood that the steps can be completed in other contexts than those described below and should not be construed as limiting in any way. The handling may include loading and unloading, and may be require one or various steps. For instance, loading may include moving the spa from a manufacturing line to a storage unit, which is an intermediate step before the same spa is moved from the storage unit to a transporting vehicle, for instance. The methods of FIGS. 15 and 16 are described using the reference numerals used in FIG. 11 and following, for ease of reading.

Referring now specifically to FIG. 15, showing the method of handling a spa. At step A, the forks 118 of a forklift may be engaged with the channels of the spa. This may be done, for instance, by sliding the forks 118 longitudinally, through the apertures 104 of the channels 102 and then raising the forks 118 such that they abut against with the channels 102 found in the base 20 of the spa. The spa 10 may then be lifted at step B from a first location, which in this case can be a manufacturing line, for instance. Once the spa 10 is lifted from the first location, it is free to be transported to a second location, which may be a storage space for instance. The spa 10 may then be brought down towards a floor, until the base 20 of the spa 10 abuts with the floor, such that it is set at the second location at step E. The forks 118 of the forklift 114 are disengaged from the channels 102 by pulling the forks 118 away from the channels 102 of the base 20, towards the floor, and subsequently longitudinally sliding the forks 118 away from the spa 10.

It is understood that the action of loading the spa may include setting the spa above a previously displaced or loaded spa. For instance, a spa may be subject to the steps A, B and C of the method in FIG. 15, wherein the first location is a storage unit, for instance, and where the second location is a transport vehicle. In such an embodiment, the method further includes step D2, where prior to setting the spa at the second location at step E, the spa is displaced in such a fashion to engage its peripheral recess with the rim portion of a corresponding spa, as shown in FIG. 14A. The method then proceeds to step E, where the spa is set at the second location in the transport vehicle, above the previously placed spa, forming a stack as shown and having been previously described in FIG. 14B. The disengagement of the forks 118 of the forklift 114 at step F occurs as previously disclosed. The forks 118 can be pulled away from the channels 102 of the base and may be floating within the channel 102 by the fact that clearance height 120 of the spa is larger than that thickness of the forks 118. As such, even if the penetration height 122 received within the basin 14 of the underlying spa is no longer providing additional spacing, there remains sufficient spacing for the forklift 114 to properly disengage from the channels of the spa.

Similarly, it is understood that the action of unloading the spa may include unloading a spa from a stack which may be in a transport vehicle, for instance. In this context, the forks 118 of the forklift 114 are longitudinally slid through the clearance height 120 of the channels 102 for engagement with the spa at step A, where the spa is then lifted from the first location, which may be the transport vehicle, at step B such as to disengage the peripheral recess of the lifted spa from the rim portion of the corresponding spa on which it is stacked at step D1. This step is perhaps best seen in FIG. 14A. The lifted spa is then free to be transported to a second location at step C. The second location may be a given client's location or a distributor's storage unit, to name some examples. As is clear from the stacked loading example above, the spa being transported may then be set on a floor at the second location, for instance, in which case step D2 may be ignored and the steps E and F are executed. The spa is thus set at the desired location as is perhaps best seen in FIG. 14C. However, in certain circumstances, the spa may be set on yet another stack of spas at the second location. In this context, the peripheral recess of the spa being transported at step C is engaged with the rim portion of another corresponding spa on which it is to be stacked at step D2, as best illustrated in FIG. 14B.

It is understood that the use of a forklift 114 and its respective forks 118 as transportation means may be altered or omitted without departing from the present disclosure. For instance, when unloading the spa at a given location, it may be preferable to engage the channels with straps, such as to lift and transport the spa via manual labour, for instance. In yet another embodiment, the step of engaging and disengaging the channels (steps A and F) may be omitted altogether without departing from the present disclosure. The step of loading and unloading may include a plurality of intermediate steps, where the spa may be displaced from a first location, to a second location, and subsequently from a second location to a third location and so forth, via the repetition of at least some of the steps of the method of FIG. 15.

Attention is now brought to FIG. 16, showing a method of engaging a modular panel to a spa. In such an example, the method can include a step of engaging a main panel to the peripheral wall, the main panel covering the at least one opening and exposing the pair of channels. The method can also include a step of, while the main panel remains engaged to the peripheral wall: using the pair of channels, moving the spa from a first location to a second location; and engaging a subpanel to the spa, the subpanel covering at least partially the pair of channels. In some embodiments, the step of engaging the subpanel to the spa includes a step of engaging the subpanel to the main panel. In these embodiments, this latter step can include a step of engaging mating engagement of the subpanel to complementary mating engagement of the main panel. The step of moving may include a step of engaging forklift forks in the pair of channels and lifting the forklift forks upwards, thereby lifting the spa above the floor. This latter step of engaging the forklift forks can also include a step of sliding the forklift forks longitudinally within the channels.

More specifically, at step G, the main panels 126 are engaged with corresponding side portions 22 of the spa 10. As the main panel 126 does not obstruct the access to the channels 102, the spa may be loaded and unloaded at step H using the method described above in reference to FIG. 15, if necessary. Step H may simply be executed one in the step of unloading, or may be repeated as required for the spa to ultimately be unloaded at a desired location. For instance, in the context where the spa is being shipped from a distributor's location to a client's housing, step H may occur once for loading the spa from the distributor's location to a transport vehicle and a second time for the unloading of the spa from the transport vehicle to the client's location. Once the spa is unloaded and the channels 102 are no longer needed, the subpanel 128 is engaged to the spa at step I. This is perhaps best seen in FIG. 14C, showing the action of engaging the subpanel to the spa, and FIG. 14D showing the spa installed.

In certain embodiments, it may be desirable to bundle the subpanel 128 and carry them along with the spa at step J1 prior to the action of unloading and loading the spa at step H. As is perhaps best seen in FIG. 14A, bundling comprises packing or otherwise attaching the subpanels 128 to the spa, and transporting the subpanels 158 with the spa during its loading and unloading steps at step H. In other words, prior or during the moving of a spa using the forklift forks, one or more subpanels 128 can be positioned inside the basin or the cavity of the spa. In this embodiment, step J1 of bundling the subpanels 128 includes inserting the subpanels 128 within the basin 14 of the spa which will receive the subpanels at step I. In FIG. 14A, the subpanels 128 are seen freely placed within the basin 14 of the first spa 110, which is then unloaded and set at a location (Step H), as seen in FIG. 14C. The subpanels 128 transported within the spa are then removed from the basin of the spa at step J2, such that they can be engaged with spa at step I (FIG. 14C).

It is understood that the placement of the subpanels 128 during the bundling step J1 can be altered without departing from the present disclosure. For instance, in an alternate embodiment, the subpanels 128 bundled with the spa are placed within another spa's cavity prior to the placement of the main panels 126. Accordingly, the removal of the subpanels 128 from the spa at step J2 may further comprise temporarily removing a main panel 126 to remove the subpanels 128 from the cavity 28 and re-engaging said removed main panel before proceeding to the engagement of the subpanels 128 with the spa.

As can be understood, the examples described above and illustrated are intended to be exemplary only. For instance, in some embodiments, the channels are edges of a single, larger canal recessed from the base towards the cavity. The scope is indicated by the appended claims.

What is claimed is:

1. A spa comprising:

a unibody shell having a base, a peripheral wall extending from the base up to a rim portion, a basin suspended from the rim portion, and at least one opening in the peripheral wall, the basin, the rim portion, the peripheral wall and the base defining a cavity therebetween, the at least one opening exposing the cavity, the base having a pair of channels recessed from the base towards the cavity; and a modular panel having a main panel covering the opening while exposing the pair of channels, and a subpanel engageable to the main panel and covering at least partially the pair of channels.

2. The spa of claim 1 wherein the main panel has a mating engagement, and the subpanel has a complementary mating engagement engageable to the mating engagement of the main panel.

3. The spa of claim 2 wherein the mating engagement is one of a slit and tab and the complementary mating engagement is the other one of the slit and tab.

4. The spa of claim 1 wherein the peripheral wall has a side portion sandwiched between two corner portions of the peripheral wall, the main panel being engaged to the corner portions.

5. The spa of claim 4 wherein opposite lateral edges of the main panel each have mating engagements and the corner portions having complementary mating engagements engageable to the mating engagements of the main panel.

6. The spa of claim 1 wherein the channels extends from a first side portion of the peripheral wall to a second side portion of the peripheral wall, the first side portion being opposite to the second side portion, the channels being exposed at both the first and second side portions.

7. The spa of claim 1 wherein the channels are parallel, separate and distinct from one another.

8. The spa of claim 1 wherein the base has a peripheral recess at an interface between the base and the peripheral wall, the peripheral recess being sized and shaped to be snugly abutted against a rim portion of another spa.

9. The spa of claim 8 wherein the peripheral wall has a plurality of side portions interspersed with corner portions, each of the plurality of side portions having a corresponding peripheral recess at an interface between the base and the corresponding side portions of the peripheral wall.

10. The spa of claim 8 wherein the channels extend through the peripheral recess of one of the side portions.

11. A method of handling a spa, the spa having a unibody shell with a base, a peripheral wall extending from the base up to a rim portion, a basin suspended from the rim portion, and at least one opening in the peripheral wall, the basin, the rim portion, the peripheral wall and the base defining a cavity therebetween, the at least one opening exposing the cavity, the base having a pair of channels recessed from the base towards the cavity, the method comprising:

engaging a main panel to the peripheral wall, the main panel covering the at least one opening and exposing the pair of channels;

while the main panel remains engaged to the peripheral wall:

using the pair of channels, moving the spa from a first location to a second location; and engaging a subpanel to the spa, the subpanel covering at least partially the pair of channels.

12. The method of claim 11 wherein said engaging the subpanel to the spa includes engaging the subpanel to the main panel.

13. The method of claim 12 wherein said engaging the subpanel to the main panel includes engaging mating engagement of the subpanel to complementary mating engagement of the main panel.

14. The method of claim 11 wherein said moving includes engaging forklift forks in the pair of channels and lifting the forklift forks upwards.

15. The method of claim 14 wherein said engaging the forklift forks includes sliding the forklift forks longitudinally within the channels.

16. The method of claim 11 further comprising, prior or during said moving, positioning the subpanel inside one of the basin and the at least one opening.

17. The method of claim 11 wherein said moving includes stacking the spa onto another spa.

18. The method of claim 17 wherein the base has a peripheral recess at an interface between the base and the peripheral wall, the peripheral recess being sized and shaped to be snugly abutted against a rim portion of another spa, wherein said stacking includes loading the peripheral recess of the spa into the rim portion of another spa.

* * * * *